United States Patent
Dobrean et al.

(10) Patent No.: US 12,481,565 B1
(45) Date of Patent: Nov. 25, 2025

(54) METADATA DISTRIBUTION ACROSS CONTAINER-SCALABLE FILE STRUCTURES

(71) Applicant: Dell Products L.P., Round Rock, TX (US)

(72) Inventors: Adrian Dobrean, Oakville (CA); Sanath KS, Palakkad (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/673,903

(22) Filed: May 24, 2024

(51) Int. Cl.
  *G06F 11/14* (2006.01)
(52) U.S. Cl.
  CPC ...... *G06F 11/1464* (2013.01); *G06F 11/1435* (2013.01); *G06F 11/1451* (2013.01)
(58) Field of Classification Search
  CPC ............. G06F 11/1464; G06F 11/1435; G06F 11/1451
  See application file for complete search history.

(56) References Cited

U.S. PATENT DOCUMENTS

| | | | | |
|---|---|---|---|---|
| 7,320,008 B1* | 1/2008 | Colgrove | ............ | G06F 21/6227 707/999.102 |
| 8,200,638 B1* | 6/2012 | Zheng | ................. | G06F 11/1469 707/681 |
| 2007/0250674 A1* | 10/2007 | Fineberg | ............. | G06F 11/1451 714/E11.123 |

* cited by examiner

*Primary Examiner* — Tony Wu
(74) *Attorney, Agent, or Firm* — Chamberlain, Hrdlicka, White, Williams & Aughtry; Aly Z. Dossa

(57) ABSTRACT

A backup device. The backup device includes: backup device storage configured to persistently maintain data and metadata related to distributed storage cluster backups according to a container-scalable file structure. The container-scalable file structure includes: a first level (L1) including at least one backup directory and a L1 metadata database; a second level (L2) branching from each backup directory of the at least one backup directory, and including at least one container directory and a L2 metadata database; and a third level (L3) branching from each container directory of the at least one container directory, and including a staging directory, a L3 metadata database, and a container data file.

20 Claims, 34 Drawing Sheets

METADATA DISTRIBUTION ACROSS CONTAINER-SCALABLE FILE STRUCTURES

BACKGROUND

When considering the protection of any data, maintained across a distributed storage cluster and managed by a distributed file system, an existing approach entails storing a native copy of said distributed file system on a backup device and, subsequently, creating point-in-time backup files (or snapshots) of said data sought to be protected. Said approach, however, is riddled with limitations.

SUMMARY

In general, in one aspect, embodiments described herein relate to a backup device. The backup device includes: backup device storage configured to persistently maintain data and metadata related to distributed storage cluster backups according to a container-scalable file structure. The container-scalable file structure includes: a first level (L1) including at least one backup directory and a L1 metadata database; a second level (L2) branching from each backup directory of the at least one backup directory, and including at least one container directory and a L2 metadata database; and a third level (L3) branching from each container directory of the at least one container directory, and including a staging directory, a L3 metadata database, and a container data file.

In general, in one aspect, embodiments described herein relate to a system. The system includes: a distributed storage cluster; and a backup device operatively connected to the distributed storage cluster. The backup device includes: backup device storage configured to persistently maintain data and metadata related to distributed storage cluster backups according to a container-scalable file structure. The container-scalable file structure includes: a first level (L1) including at least one backup directory and a L1 metadata database; a second level (L2) branching from each backup directory of the at least one backup directory, and including at least one container directory and a L2 metadata database; and a third level (L3) branching from each container directory of the at least one container directory, and including a staging directory, a L3 metadata database, and a container data file.

Other aspects of the embodiments described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Figure 1A:
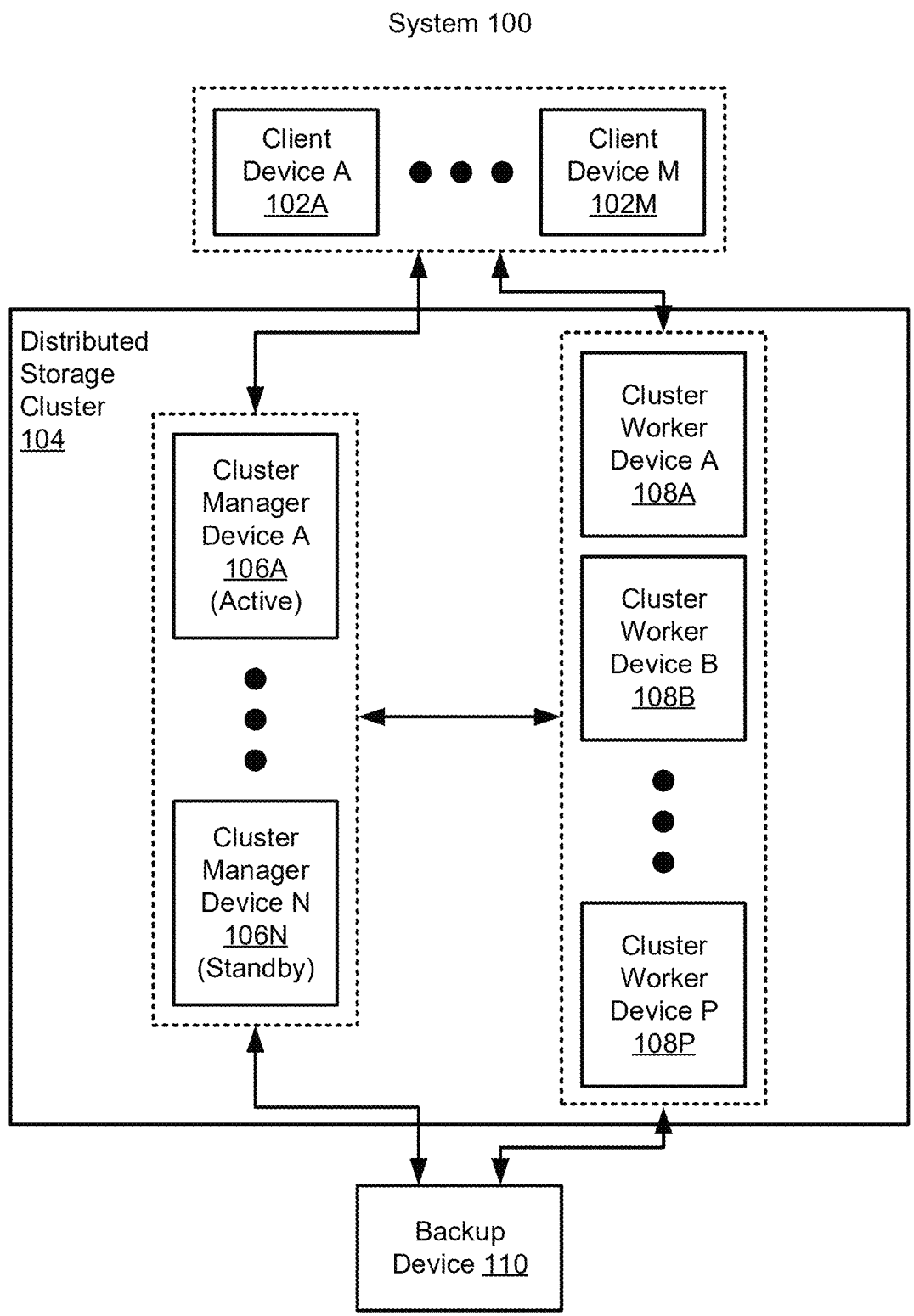
FIG. 1A shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to metadata distribution across container-scalable file structures. Concerning data management on distributed storage clusters, distributed file systems are often used. Further, when considering the protection of any data, maintained across a distributed storage cluster and managed by a distributed file system, an existing approach entails storing a native copy of said distributed file system on a backup device and, subsequently, creating point-in-time backup files (or snapshots) of said data sought to be protected. Said approach, however, is riddled with limitations that the solution described herein addresses. Particularly, instead of duplicating the distributed file system, as well as relying on snapshots to protect data, on the backup device, embodiments described herein provide management of backed-up data by way of a container-scalable file structure. Through said container-scalable file structure, any data sought to be protected may be stored across one or more container directories each including a synthesized flat file of said data (or data portion) assigned thereto. Metadata, pertaining to said data, furthermore, may be distributed across multiple levels of said container-scalable file structure for data access performance.

FIG. 1A shows a system in accordance with one or more embodiments described herein. The system (100) includes any number of client devices (102A-102N), a distributed storage cluster (104), and a backup device (110). Each of these system (100) components is described below.

In one or many embodiment(s) described herein, any client device (102A-102M) may represent a physical appliance at least configured to receive, generate, process, store, and/or transmit data, as well as interact with the distributed storage cluster (104). In interacting with the distributed storage cluster (104), any client device (102A-102M) may include functionality to: load or store data (e.g., files or file blocks) into/onto the distributed storage cluster (104); submit requests to the distributed storage cluster (104), where said requests specify tasks detailing how any data loaded/stored on the distributed storage cluster (104) should be handled or processed; and receive results from the distributed storage cluster (104), where said results include any handled/processed data obtained via servicing of any requests. One of ordinary skill, however, will appreciate that any client device (102A-102M) may perform other functionalities without departing from the scope of the embodiments described herein.

Examples of any client device (102A-102M) may include, but are not limited to, a desktop computer, a laptop computer, a network server, a smartphone, a tablet computer, or any computing system similar to the exemplary computing system illustrated and described with respect to FIG. 9, below.

In one or many embodiment(s) described herein, the distributed storage cluster (104) may represent a decentralized storage system whereon data (e.g., files or file blocks) may be disseminated and replicated across multiple devices. The distributed storage cluster (104) may thus include functionality to store and analyze vast amounts of unstructured and structured data within a distributed computing environment. One of ordinary skill, however, will appreciate that the distributed storage cluster (104) may perform other functionalities without departing from the scope of the embodiments described herein.

In one or many embodiment(s) described herein, the distributed storage cluster (104) may be implemented through on-premises infrastructure, cloud computing infrastructure, or any hybrid infrastructure thereof. The distributed storage cluster (104), accordingly, may be implemented using one or more network servers (not shown), where each said network server may represent a physical or a virtual network server. Additionally, or alternatively, the distributed storage cluster (104) may be implemented using one or more computing systems similar to the exemplary computing system illustrated and described with respect to FIG. 9, below.

In one or many embodiment(s) described herein, the distributed storage cluster (104) may operate based on manager-worker architecture. Through said manager-worker architecture, the distributed storage cluster (104) may include a manager or control plane (not shown) and a worker or data plane (not shown), where the former coordinates and controls the latter. The manager/control plane includes multiple cluster manager devices (106A-106N), whereas the worker/data plane includes multiple cluster worker devices (108A-108P). Each of these distributed storage cluster (104) subcomponents is described below.

In one or many embodiment(s) described herein, any cluster manager device (106A-106N) may represent a physical appliance at least configured to provide an environment in which manager (or manager) instances of a distributed file system and a distributed workload framework execute thereon. In providing said execution environment for said manager/manager instances, any cluster manager device (106A-106N) may include or have access to, and thus allocate and de-allocate, various resources (e.g., computer processors, memory, storage, virtualization, network bandwidth, etc.), as needed, to the manager/manager instances. One of ordinary skill, however, will appreciate that any cluster manager device (106A-106N) may perform other functionalities without departing from the scope of the embodiments described herein.

In one or many embodiment(s) described herein, a distributed file system may generally refer to any file system capable of logically distributing and/or replicating data across multiple devices. A distributed workload framework, on the other hand, may generally refer to any framework capable of achieving the distributed processing of vast amounts of unstructured and structured data.

In one or many embodiment(s) described herein, at any given time during the operation of the distributed storage cluster (104), a singular cluster manager device (e.g., 106A) may operate as an active cluster manager device, whereas any remaining cluster manager device(s) (e.g., 106N) may each operate as a standby cluster manager device. That is, the multiple cluster manager devices (106A-106N) may collectively operate in an active-standby high availability configuration, thereby providing the continuous availability of any manager/control plane functionalities with minimal or zero downtime.

In one or many embodiment(s) described herein, any cluster manager device (106A-106N) is illustrated and described in further detail below with respect to FIG. 1B.

In one or many embodiment(s) described herein, any cluster worker device (108A-108P) may represent a physical appliance at least configured to provide an environment in which worker (or worker) instances of a distributed file system and a distributed workload framework execute thereon. In providing said execution environment for said worker/worker instances, any cluster worker device (108A-108P) may include or have access to, and thus allocate and de-allocate, various resources (e.g., computer processors, memory, storage, virtualization, network bandwidth, etc.), as needed, to the worker/worker instances. One of ordinary skill, however, will appreciate that any cluster worker device (108A-108P) may perform other functionalities without departing from the scope of the embodiments described herein.

In one or many embodiment(s) described herein, any cluster worker device (108A-108P) is illustrated and described in further detail below with respect to FIG. 1C.

In one or many embodiment(s) described herein, the backup device (110) may represent a data backup, archiving, and/or disaster recovery storage system. To that extent, the backup device (110) may include functionality to: maintain copies of various forms of digital information (e.g., file or file blocks, and any metadata thereof) written thereto, by at least the distributed storage cluster (104), during any number of backup operations targeting any data (e.g., files or file blocks) loaded or stored on the distributed storage cluster (104) sought for protection from loss or corruption; and recover said copies of various forms of digital information, to be read therefrom by at least the distributed storage cluster (104), during any number of restoration operations entailing any data affected by any failure that had transpired on the distributed storage cluster (104). One of ordinary skill, however, will appreciate that the backup device (110) may perform other functionalities without departing from the scope of the embodiments described herein.

In one or many embodiment(s) described herein, the backup device (110) may be implemented through on-premises infrastructure, cloud computing infrastructure, or any hybrid infrastructure thereof. The backup device (110), accordingly, may be implemented using one or more storage servers (not shown), where each storage server may represent a physical or a virtual storage server. Additionally, or alternatively, the backup device (110) may be implemented using one or more computing systems similar to the exemplary computing system illustrated and described with respect to FIG. 9, below.

In one or many embodiment(s) described herein, the storage server(s) of the backup device (110) may include a collection of one or more physical storage devices (not shown) on which various forms of digital information—e.g., files or file blocks, and any metadata thereof—may be maintained. Each physical storage device may encompass non-transitory computer readable storage media on which said digital information may be stored in whole or in part, and temporarily or permanently. Further, the physical storage device(s) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In or many embodiment(s) described herein, the backup device (110) is illustrated and described in further detail below with respect to FIG. 1D.

In one or many embodiment(s) described herein, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the embodiments described herein.

Figure 1B:
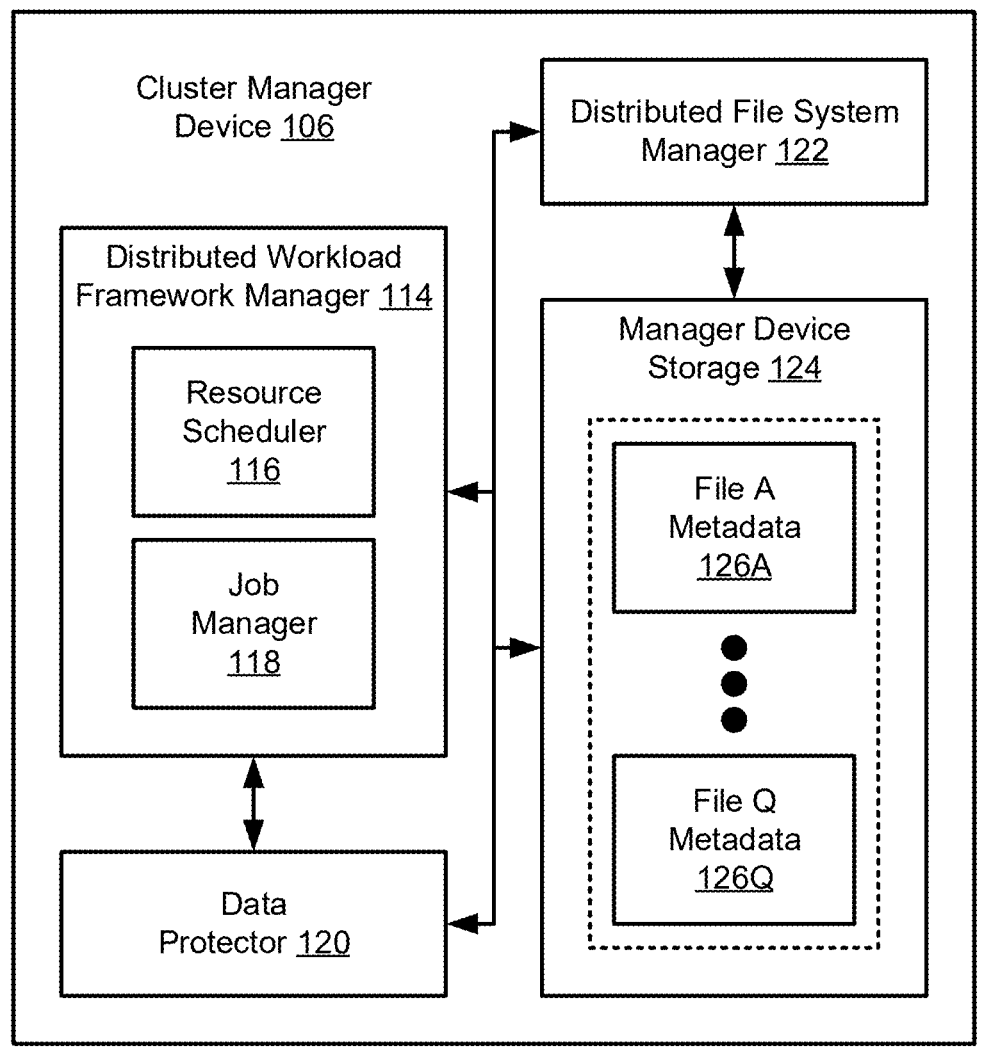
FIG. 1B shows a cluster manager device in accordance with one or more embodiments described herein.

FIG. 1B shows a cluster manager device in accordance with one or more embodiments described herein. The cluster manager device (106) includes a distributed workload framework manager (114), a data protector (120), a distributed file system manager (122), and manager device storage (124). Each of these cluster manager device (106) subcomponents is described below.

In one or many embodiment(s) described herein, the distributed workload framework manager (114) may refer to instruction-processing hardware (e.g., any number of integrated circuits for processing computer readable instructions), a computer program executing on the underlying hardware of the cluster manager device (106), or any combination thereof, at least configured for workload execution management. Workload execution management may pertain to the overseeing of any workload(s) (e.g., service, computational task/function, data transaction, software application, etc.) sought, at least in part, in the handling/processing any data (e.g., files or file blocks) maintained across the distributed storage cluster (see e.g., FIG. 1A).

In one or many embodiment(s) described herein, and at least in part, the distributed workload framework manager (114) may include functionality to: receive requests (e.g., full copy-write, incremental copy-write, or copy-read) from the data protector (120), where said requests pertain to copying data from one or more cluster worker devices to the backup device to, at least in part, fulfill any full and incremental backup operations, and pertain to copying data from the backup device to the cluster worker device(s) to, at least in part, fulfill any restoration operations; assign jobs to one or more distributed workload framework workers on one or more cluster worker devices, respectively, where said jobs entail instructions for performing any workload(s) directed to, at least in part, fulfilling any received requests; petition the distributed file system manager (122) for any metadata (e.g., information describing any file(s) or file block(s)) pertinent to, at least in part, fulfilling any received requests; receive completion notices from any distributed workload framework worker(s) concerning the successful completion of any assigned jobs; and inform the data protector (120) of the successful completion of any received requests therefrom. One of ordinary skill, however, will appreciate that the distributed workload framework manager (114) may perform other functionalities without departing from the scope of the embodiments described herein.

In one or many embodiment(s) described herein, the distributed workload framework manager (114) includes a resource scheduler (116) and a job manager (118), which aid in the responsibility of workload execution management. Each of these distributed workload framework manager (114) subcomponents is described below.

In one or many embodiment(s) described herein, the resource scheduler (116) may refer to instruction-processing hardware (e.g., any number of integrated circuits for processing computer readable instructions), a computer program executing on the underlying hardware of the cluster manager device (106), or any combination thereof, at least configured for cluster resource allocation. To that extent, the resource scheduler (116) may include functionality to: allocate and de-allocate cluster resources (e.g., computer processors, memory, storage, virtualization, network bandwidth, etc.), as needed, to any number of job workers (see e.g., FIG. 1C) executing across any cluster worker device(s). One of ordinary skill, however, will appreciate that the resource scheduler (116) may perform other functionalities without departing from the scope of the embodiments described herein.

In one or many embodiment(s) described herein, the job manager (118) may refer to instruction-processing hardware (e.g., any number of integrated circuits for processing computer readable instructions), a computer program executing on the underlying hardware of the cluster manager device (106), or any combination thereof, at least configured for workload or job processing management.

In one or many embodiment(s) described herein, the data protector (120) may refer to instruction-processing hardware (e.g., any number of integrated circuits for processing computer readable instructions), a computer program executing on the underlying hardware of the cluster manager device (106), or any combination thereof, at least configured to orchestrate backup and restoration operations concerning data stored across the distributed storage cluster.

In one or many embodiment(s) described herein, and at least in part, the data protector (120) may include functionality to: process full backup requests (see e.g., FIGS. 3A-3D); process incremental backup requests (see e.g., FIGS. 5A-5I); and process restoration requests (see e.g., FIGS. 7A-7E). One of ordinary skill, however, will appreciate that the data protector (120) may perform other functionalities without departing from the scope of the embodiments described herein.

In one or many embodiment(s) described herein, the distributed file system manager (122) may refer to instruction-processing hardware (e.g., any number of integrated circuits for processing computer readable instructions), a computer program executing on the underlying hardware of the cluster manager device (106), or any combination thereof, at least configured for file metadata management.

Figure 8A:
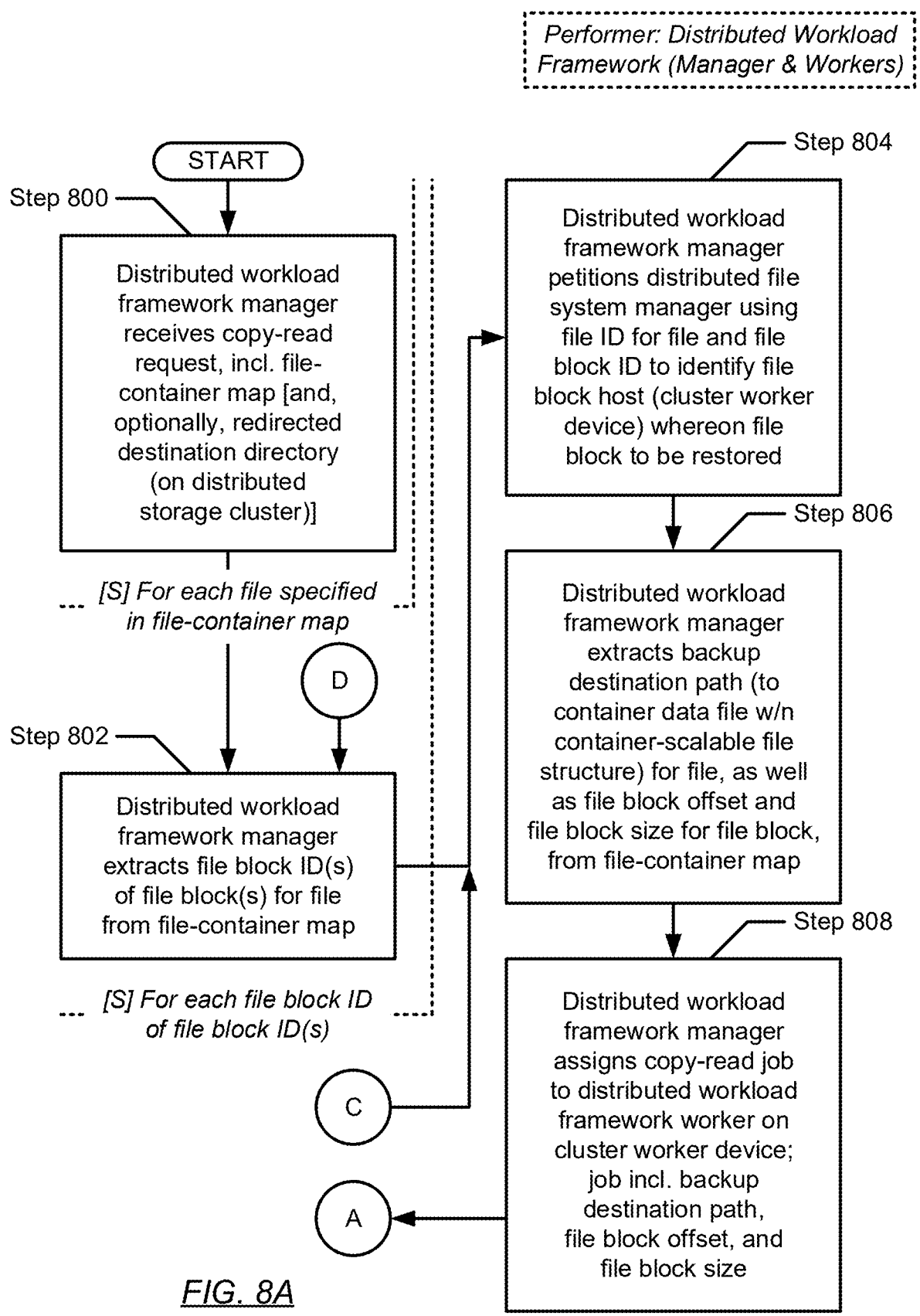
FIGS. 8A-8C show a flowchart outlining a method for processing a copy-read request in accordance with one or more embodiments described herein.
Figure 8B:
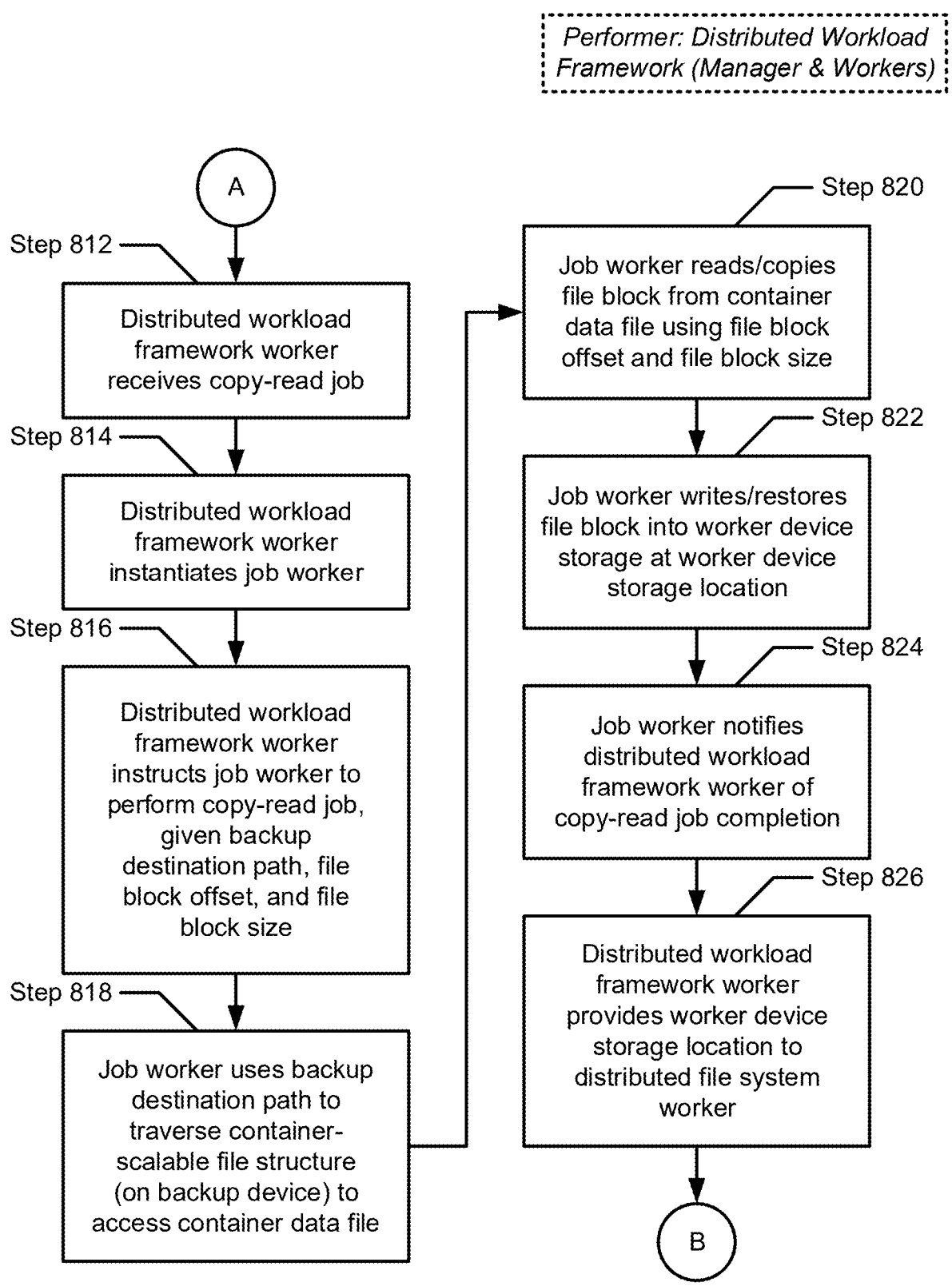
Figure 8C:
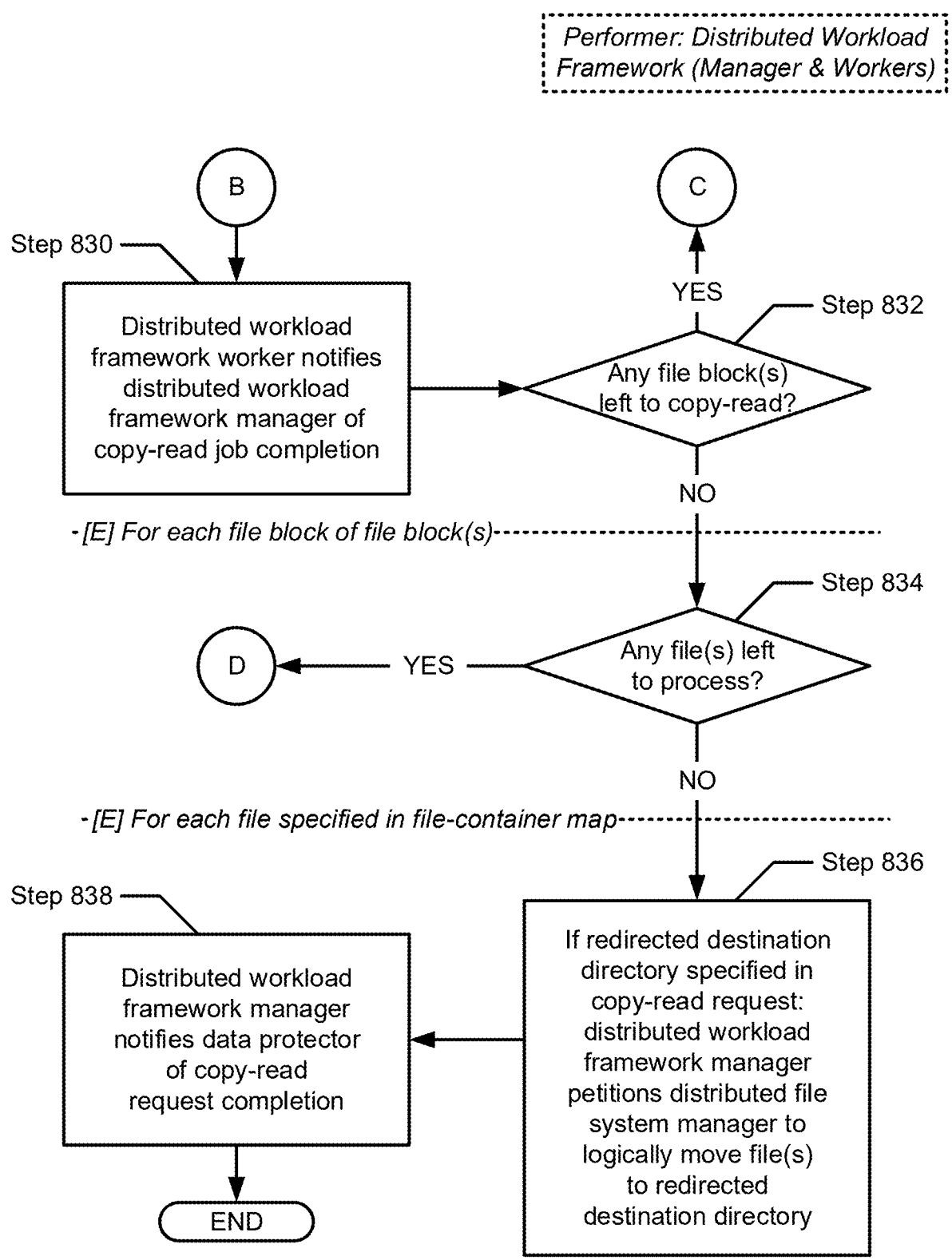

In one or many embodiment(s) described herein, and at least in part, the distributed file system manager (122) may include functionality to (at least in part): process full copy-write requests (see e.g., FIGS. 4A-4C); process incremental copy-write requests (see e.g., FIGS. 6A-6C); and process copy-read requests (see e.g., FIGS. 8A-8C). One of ordinary skill, however, will appreciate that the distributed file system manager (122) may perform other functionalities without departing from the scope of the embodiments described herein.

In one or many embodiment(s) described herein, the manager device storage (124) may refer to a data repository at least configured to persistently maintain any information pertinent to cluster manager device (106) operations and/or responsibilities.

In one or many embodiment(s) described herein, and at least in part, the manager device storage (124) may include functionality to store file metadata (126A-126Q) pertaining to any number of files and/or file blocks stored across the distributed storage cluster (see e.g., FIG. 1A). Examples of file metadata, for any given file, may include: (a) a filename for the given file; (b) a file size specifying a number of bytes forming the given file; (c) one or more file block IDs for one or more file blocks, respectively, of the given file; and (d) cluster worker device(s) on which each file block (or replica(s) thereof) for the given file is/are stored. Said file metadata, for any given file, is/are not limited to the aforementioned specific examples.

While FIG. 1B shows a configuration of components and/or subcomponents, other cluster manager device (106) configurations may be used without departing from the scope of the embodiments described herein.

Figure 1C:
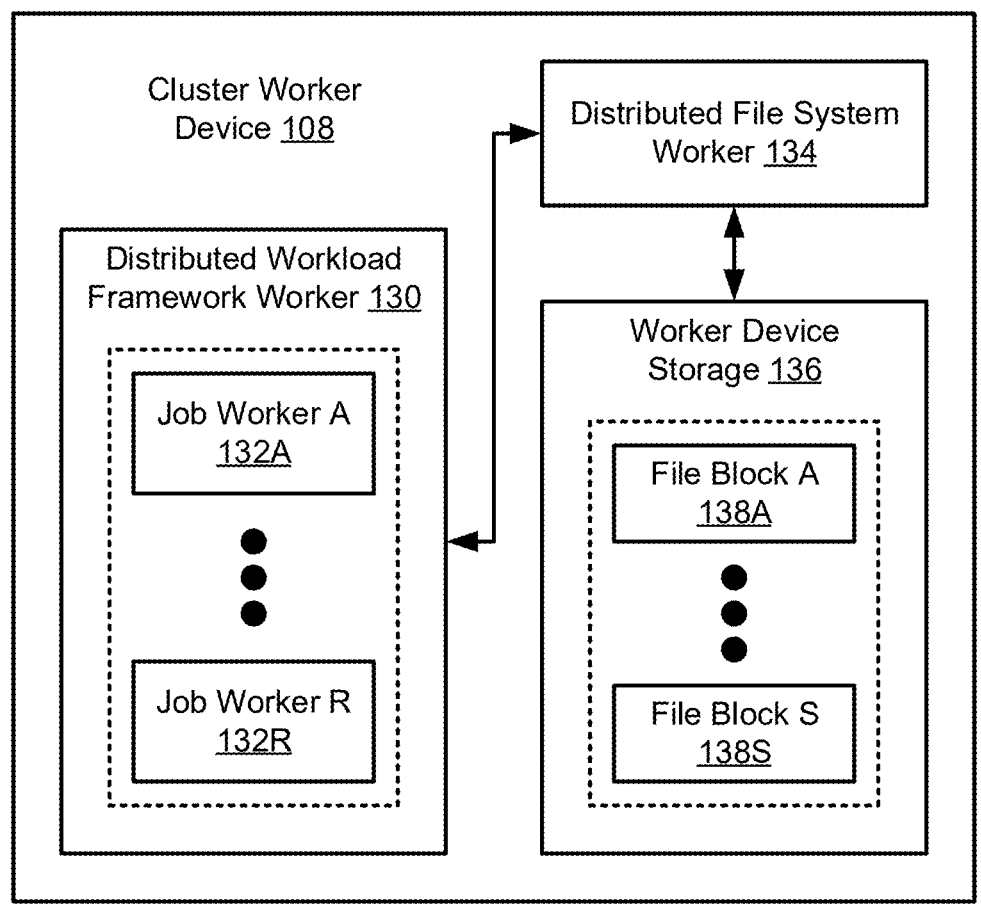
FIG. 1C shows a cluster worker device in accordance with one or more embodiments described herein.

FIG. 1C shows a cluster worker device in accordance with one or more embodiments described herein. The cluster worker device (108) includes a distributed workload framework worker (130), a distributed file system worker (134), and worker device storage (136). Each of these cluster worker device (108) subcomponents is described below.

In one or many embodiment(s) described herein, the distributed workload framework worker (130) may refer to instruction-processing hardware (e.g., any number of integrated circuits for processing computer readable instructions), a computer program executing on the underlying hardware of the cluster worker device (108), or any combination thereof, at least configured for assigned workload execution on the cluster worker device (108).

In one or many embodiment(s) described herein, and at least in part, the distributed workload framework worker (130) may include functionality to (at least in part): process full copy-write requests (see e.g., FIGS. 4A-4C); process incremental copy-write requests (see e.g., FIGS. 6A-6C); and process copy-read requests (see e.g., FIGS. 8A-8C). One of ordinary skill, however, will appreciate that the distributed file system worker (130) may perform other functionalities without departing from the scope of the embodiments described herein.

In one or many embodiment(s) described herein, the distributed workload framework worker (130) may instantiate and instruct, and thus include, any number of job workers (132A-132R). Any job worker (132A-132R) may refer to a standalone, lightweight virtualization environment within which a software application and its dependencies (e.g., libraries, binaries, tools, configuration files/settings, etc.) execute. Any job worker (132A-132R), further, may be infrastructure- and/or operating system (OS)-agnostic, meaning that any job worker (132A-132R) may operate on/over any hardware resources and/or OS. Said software application, in turn, may refer to a computer program, or computer readable instructions, which when executed or invoked, perform one or more tasks directed to a specific purpose.

In one or many embodiment(s) described herein, the distributed file system worker (134) may refer to instruction-processing hardware (e.g., any number of integrated circuits for processing computer readable instructions), a computer program executing on the underlying hardware of the cluster worker device (108), or any combination thereof, at least configured for file block management for any file block(s) stored on the cluster worker device (108).

In one or many embodiment(s) described herein, the worker device storage (136) may refer to a data repository at least configured to persistently maintain any information pertinent to cluster worker device (108) operations and/or responsibilities.

In one or many embodiment(s) described herein, and at least in part, the worker device storage (136) may include functionality to store file blocks (138A-138S) pertaining to any number of files.

While FIG. 1C shows a configuration of components and/or subcomponents, other cluster worker device (108) configurations may be used without departing from the scope of the embodiments described herein.

Figure 1D:
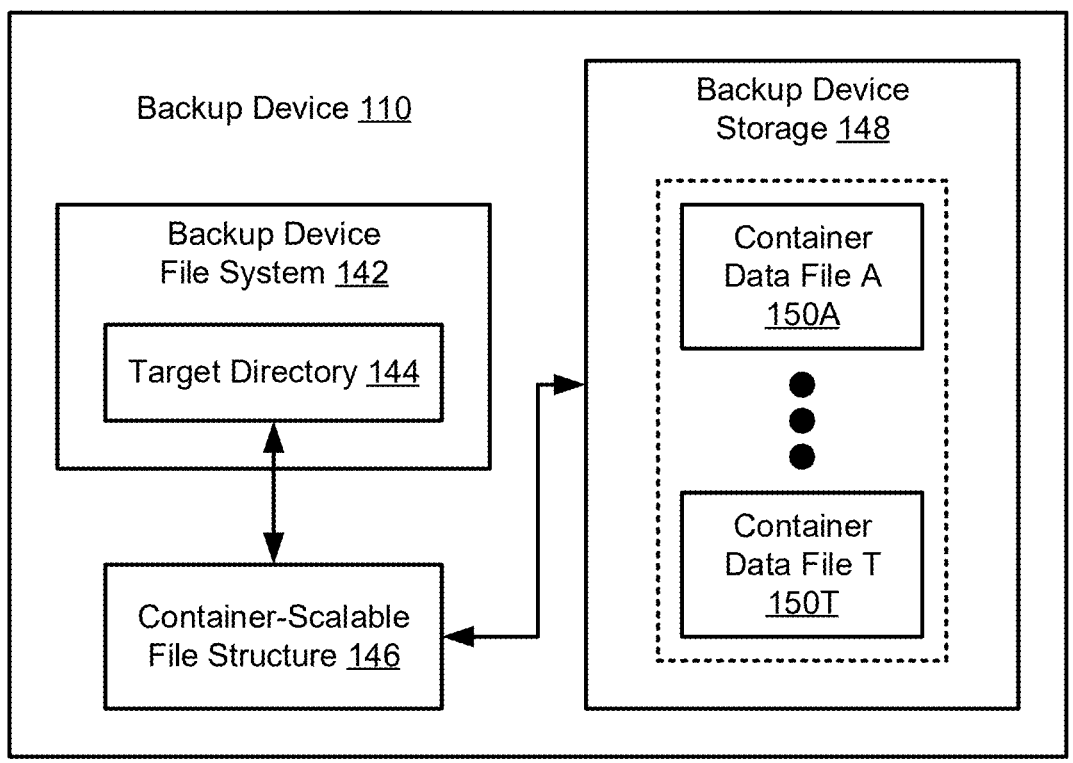
FIG. 1D shows a backup device in accordance with one or more embodiments described herein.

FIG. 1D shows a backup device in accordance with one or more embodiments described herein. The backup device (110) includes a backup device file system (142), a container-scalable file structure (146), and backup device storage (148). Each of these backup device (110) subcomponents is described below.

In one or many embodiment(s) described herein, the backup device file system (142) may refer to a hierarchical data structure wherein any data stored on the backup device (110) may be organized and/or managed. The backup device file system (142) includes a target directory (144) wherein any data, as well as any metadata thereof, stored across the distributed storage cluster and sought for protection, may be maintained.

In one or many embodiment(s) described herein, the container-scalable file structure (146) may refer to a hierarchical data structure wherein any data, stored on the distributed storage cluster and sought for protection via full and incremental backup operations, may be organized and/or managed. The container-scalable file structure (146) enables horizontal, as well as vertical, scaling of backups. The container-scalable file structure (146) is illustrated and described in further detail with respect to FIG. 2A, below.

In one or many embodiment(s) described herein, the backup device storage (148) may refer to a data repository at least configured to persistently maintain any information pertinent to backup device (110) operations and/or responsibilities.

In one or many embodiment(s) described herein, the backup device storage (148) may include functionality to store any number of container data files (150A-150T). Any container data file (150A-150T) may refer to a flat file wherein data (without any metadata descriptive thereof) for any number of files is stored.

While FIG. 1D shows a configuration of components and/or subcomponents, other backup device (110) configurations may be used without departing from the scope of the embodiments described herein.

Figure 2A:
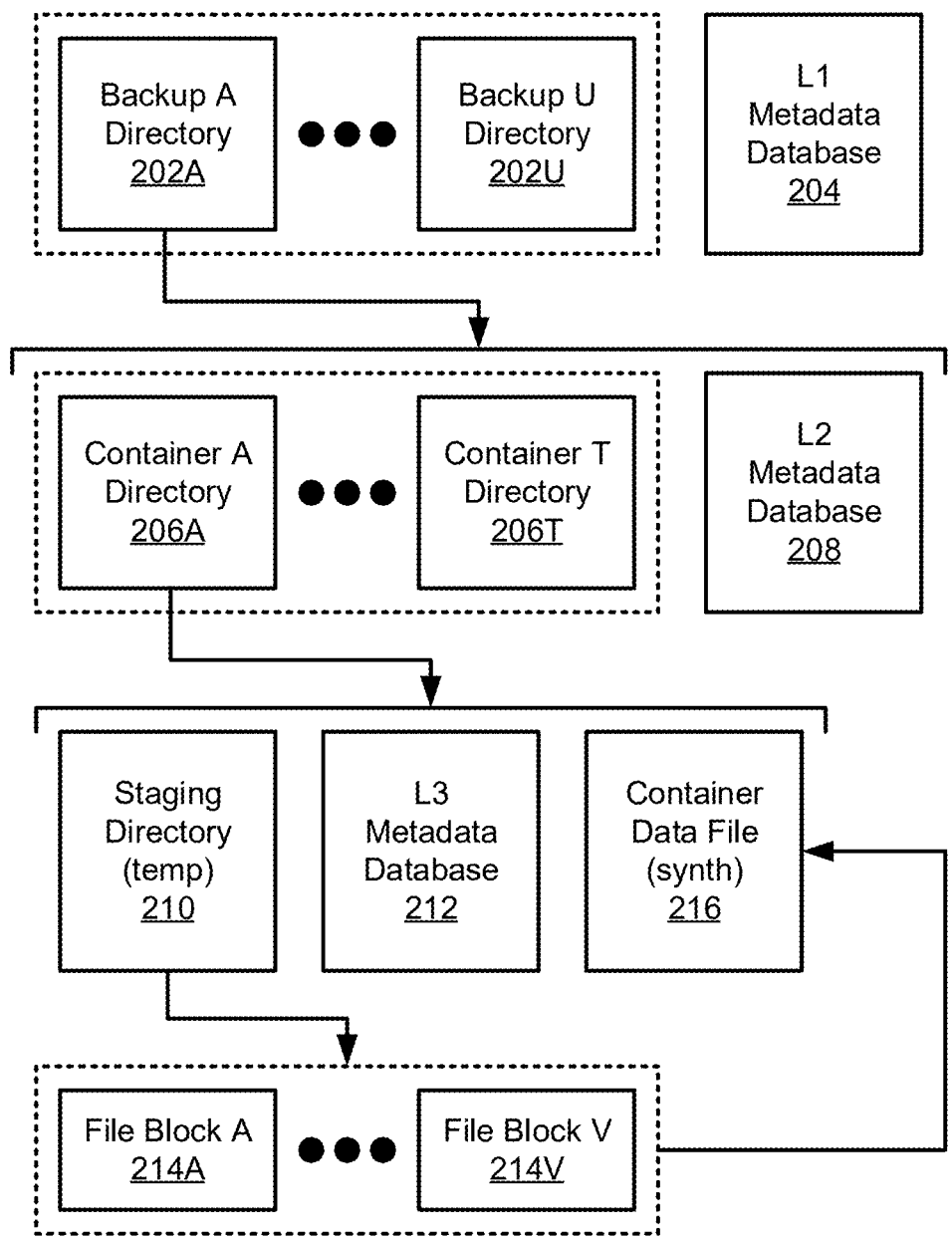
FIG. 2A shows a container-scalable file structure in accordance with one or more embodiments described herein.

FIG. 2A shows a container-scalable file structure in accordance with one or more embodiments described herein. The container-scalable file structure (200) includes multiple tiers or levels of information. Information maintained in each of said tiers/levels is described below.

In one or many embodiment(s) described herein, a first tier/level (L1) of the container-scalable file structure (200) includes one or more backup directories (202A-102U) and a L1 metadata database (204). Any backup directory (202A-202U) may refer to a cataloguing structure that references any number of other information maintained there-under. Further, any backup directory (202A-202U) may pertain to either a full backup operation or an incremental backup operation concerning any data on the distributed storage cluster sought to be protected. The L1 metadata database (204), meanwhile, may refer to a data repository at least configured to store and/or track any metadata concerning each backup operation (e.g., full or incremental) that had targeted any specified data stored on the distributed storage cluster.

In one or many embodiment(s) described herein, a second tier/level (L2) of the container-scalable file structure (200) includes one or more container directories (206A-206T) and a L2 metadata database (208), which may be collectively stored under each backup directory (202A-202U) at L1 of the container-scalable file structure (200). Any container directory (206A-206T) may refer to a cataloguing structure that references any number of other information maintained there-under. Further, any container directory (206A-206T) may pertain to a collection of files assigned thereto, where said collection of files encompass at least a subset of the total files being protected through either a full backup operation or an incremental backup operation. The L2 metadata database (208), meanwhile, may refer to a data repository at least configured to persistently maintain any metadata pertinent to any container directory/directories (206A-206T).

In one or many embodiment(s) described herein, a third tier/level (L3) of the container-scalable file structure (200) includes a staging directory (210), a L3 metadata database (212), and a container data file (216), which may be collectively stored under each container directory (206A-206T) at L2 of the container-scalable file structure (200). The staging directory (210) may refer to a temporary cataloguing structure that references any number of other (temporary) information maintained there-under. Said other (temporary) information may include one or more file blocks (214A-214V) for any number of files assigned to the container directory (206A-206T) under which the staging directory (210) is maintained. The L3 metadata database (208), meanwhile, may refer to a data repository at least configured to persistently maintain any metadata pertinent to the container data file (216). Examples of said metadata may include file and/or file block offsets and sizes concerning any file(s) forming the container data file (216). The container data file (216), in turn, may refer to a flat file synthesized from any file block(s) (214A-214V) stored in/under the staging directory (210).

Figure 2B:
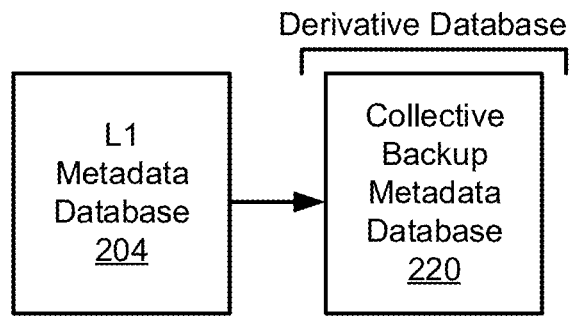
FIG. 2B shows a L1 metadata database and a derivative database thereof in accordance with one or more embodiments described herein.

FIG. 2B shows a L1 metadata database and a derivative database thereof in accordance with one or more embodiments described herein. A derivative database may refer to any database derived from another database and, therefore, maintains at least a subset of the content stored in said other database. Concerning the L1 metadata database (204), the derivative database thereof includes a collective backup metadata database (220). The collective backup metadata database (220) may store and/or track any metadata concerning each backup operation (e.g., full or incremental) that had targeted any specified data stored on the distributed storage cluster.

Further, for a given backup operation, examples of said metadata stored and/or tracked in the collective backup metadata database (220) include: (a) a source directory (or a directory path thereof), on the distributed storage cluster, originally storing the data that had been sought to be protected by the given backup operation; (b) a user-readable backup name for the given backup operation; (c) a backup type (e.g., full or incremental) corresponding to the given backup operation; (d) a number of container directories (see e.g., FIG. 2A) created, within the container-scalable file structure, for the given backup operation; (e) a backup creation time specifying a date and/or time at which the given backup operation commenced; and (f) a backup retention time specifying a duration of time the data, that had been sought to be protected by the given backup operation, is to be retained prior to deletion. Said metadata, for any given backup operation, stored and/or tracked in the L1 metadata database (or the collective backup metadata database) is/are not limited to the aforementioned specific examples.

Figure 2C:
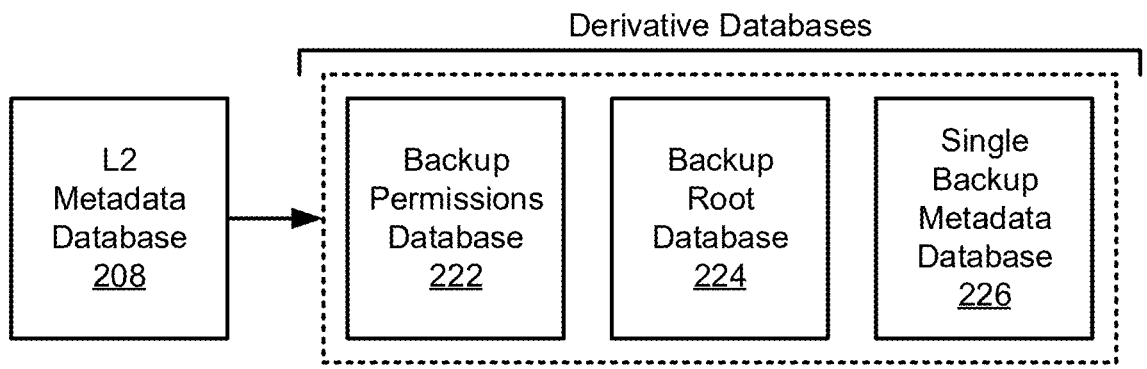
FIG. 2C shows a L2 metadata database and derivative databases thereof in accordance with one or more embodiments described herein.

FIG. 2C shows a L2 metadata database and derivative databases thereof in accordance with one or more embodiments described herein. A derivative database may refer to any database derived from another database and, therefore, maintains at least a subset of the content stored in said other database. Concerning the L2 metadata database (208), the derivative databases thereof include a backup permissions database (222), a backup root database (224), and a single backup metadata database (226). The backup permissions database (222) may store and/or track any metadata concerning access and/or permissions information for any owner(s)/user(s) of the specified data protected through a (single) backup operation (e.g., full or incremental); the backup root database (224) may store and/or track any metadata concerning any number of files protected through the (single) backup operation; and the single backup metadata database (224) may store and/or track any metadata concerning the (single) backup operation. The L2 metadata database (208), meanwhile, may store and/or track the superset (or all) of the metadata maintained across the derivative databases thereof.

For any single backup operation, examples of said metadata stored and/or tracked in the backup permissions database (222) include: (a) a full path for any file(s) protected through the single backup operation; (b) owner/user details pertaining to the owner(s)/user(s) of any file(s) protected through the single backup operation; (c) permission details pertaining to the access requirement(s) for accessing any file(s) protected through the single backup operation; (d) a last accessed time specifying a date and/or time at which any file(s), protected through the single backup operation, had last been accessed; and (e) a last modified time specifying a date and/or time at which any file(s), protected through the single backup operation, had last been modified. Said metadata, for any single backup operation, stored and/or tracked in the backup permissions database (222) is/are not limited to the aforementioned specific examples.

Further, for each file protected through any single backup operation, examples of said metadata stored and/or tracked in the backup root database (224) include: (a) an assignment relating a filename for the file and a container directory number for a container directory (within the scalable-container file structure and residing under the backup directory) at least storing the file; (b) a file size for the file; (c) a full path for the file on the distributed storage cluster; and (d) a write time specifying a date and/or time at which the file had been copied/written into the backup device through the single backup operation. Said metadata, for each file protected through any single backup operation, stored and/or tracked in the backup root database (224) is/are not limited to the aforementioned specific examples.

Moreover, for any single backup operation, examples of said metadata stored and/or tracked in the single backup metadata database (228) include: (a) a source directory (or a directory path thereof), on the distributed storage cluster, originally storing any file(s) protected through the single backup operation; (b) a user-readable backup name for the single backup operation; (c) a backup type (e.g., full or incremental) corresponding to the single backup operation; (d) a number of container directories (see e.g., FIG. 2A) created, within the container-scalable file structure, for the single backup operation; (c) a backup creation time specifying a date and/or time at which the single backup operation commenced; and (f) a backup retention time specifying a duration of time any file(s), protected by the single backup operation, is to be retained prior to deletion. Said metadata, for any single backup operation, stored and/or tracked in the single backup metadata database (228) is/are not limited to the aforementioned specific examples.

Figure 2D:
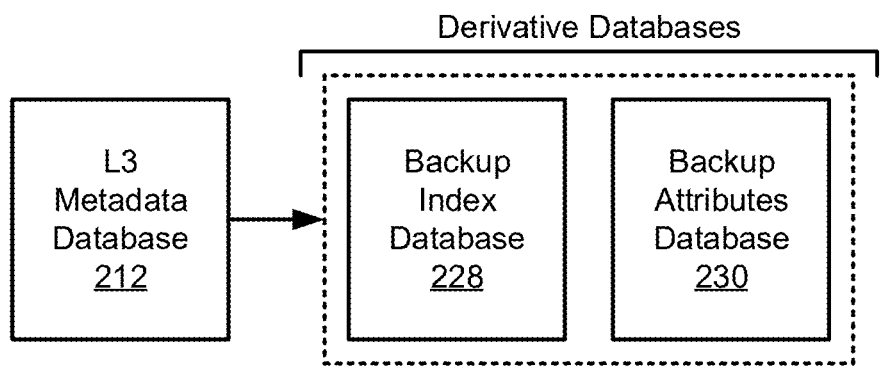
FIG. 2D shows a L3 metadata database and derivative databases thereof in accordance with one or more embodiments described herein.

FIG. 2D shows a L3 metadata database and derivative databases thereof in accordance with one or more embodiments described herein. A derivative database may refer to any database derived from another database and, therefore, maintains at least a subset of the content stored in said other database. Concerning the L3 metadata database (212), the derivative databases thereof include a backup index database (228) and a backup attributes database (230). The backup index database (228) stores indexing information for one or more files forming a container data file (see e.g., FIG. 2A), whereas the backup attributes database (230) stores extra attribute information regarding one or more files. The L3 metadata database (212), meanwhile, may store and/or track the superset (or all) of the metadata maintained across the derivative databases thereof.

For a given file assigned to any given container directory, examples of said metadata stored and/or tracked in the backup index database (228) include: (a) a container data filename for a container data file (see e.g., FIG. 2A) at least in part synthesized from the given file; (b) a file offset specifying a starting byte or address in the container data file whereat the file data for the given file is stored; (c) one or more file block offsets each specifying a starting byte or address in the container data file whereat file block data for a file block of the given file is stored; (d) a file size specifying a number of bytes forming the file data for the given file; and (e) one or more file block sizes each specifying a number of bytes forming the file block data for a file block of the given file. Said metadata, for any given file assigned to any container directory, stored and/or tracked in the backup index database (228) is/are not limited to the aforementioned specific examples.

Further, for a given file assigned to any given container directory, examples of said metadata stored and/or tracked in the backup attributes database (230) include: (a) a full path specifying a location on the distributed storage cluster whereat the given file had originally been stored; and (b) extended attribute details for one or more extended attributes corresponding to the given file. Said metadata, for any given file assigned to any container directory, stored and/or tracked in the backup attributes database (230) is/are not limited to the aforementioned specific examples.

Figure 3A:
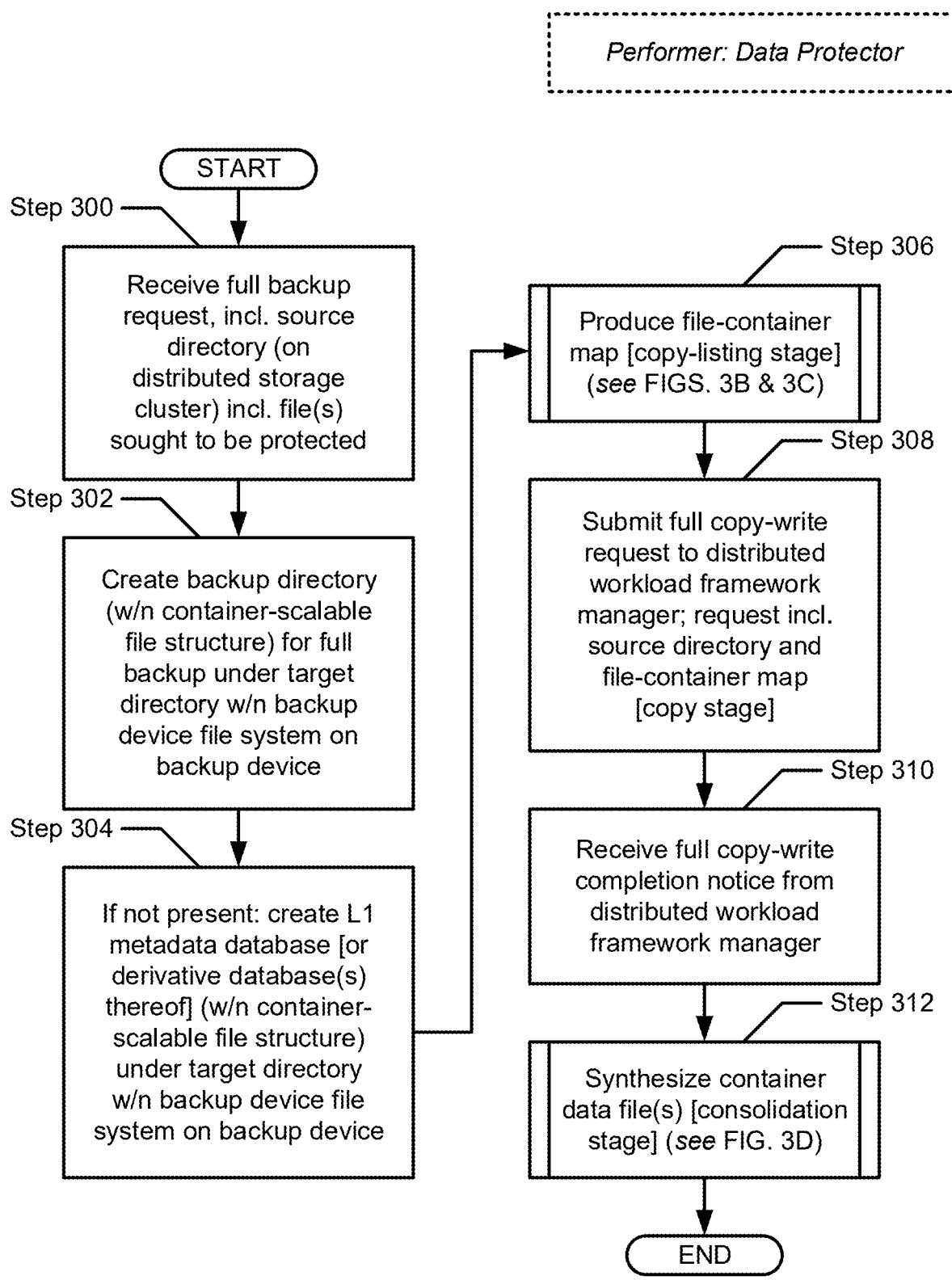
FIG. 3A shows a flowchart outlining a method for processing a full backup request in accordance with one or more embodiments described herein.

FIG. 3A shows a flowchart outlining a method for processing a full backup request in accordance with one or more embodiments described herein. The various steps outlined below may be performed by the data protector (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a full backup request is received. In one or many embodiment(s) described herein, the full backup request may pertain to performing a full backup operation targeting certain data stored on the distributed storage cluster. Further, the full backup request may specify a source directory including said certain data, where said certain data may encompass one or more files sought to be protected through the full backup operation.

In Step 302, a backup directory, corresponding to the prospective full backup operation associated with the full backup request (received in Step 300), is created. In one or many embodiment(s) described herein, the backup directory may reside within a first level (L1) of the container-scalable file structure (see e.g., FIG. 2A). The container-scalable file structure, in turn, resides under, and is thus accessible through, a target directory within a backup device file system on the backup device (see e.g., FIG. 1D).

In Step 304, if not already present within the L1 of the container-scalable file structure, a L1 metadata database [or the derivative database thereof—i.e., a collective backup metadata database (see e.g., FIG. 2B)] is created. In one or many embodiment(s) described herein, the L1 metadata database (or the derivative database thereof) may refer to a data repository configured to store and/or track any metadata concerning each backup operation (e.g., full or incremental) that had targeted any specified data stored on the distributed storage cluster.

In Step 306, a file-container map is produced. In one or many embodiment(s) described herein, the file-container map may refer to a data structure at least conveying any assignment(s) (of any file(s)—specified in the source directory (received via the full backup request in Step 300)—to one or more container directories to be created within the container-scalable file structure for the full backup operation). The file-container map may further convey a backup destination path identifying a location in the container-scalable file structure (see e.g., FIG. 2A) pertaining to a staging directory dedicated to storing backup copies of any file(s) specified in the source directory. Said production of the file-container map is illustrated and described in further detail with respect to FIGS. 3B and 3C, below.

In Step 308, a full copy-write request is submitted to the distributed workload framework manager (see e.g., FIG. 1B). In one or many embodiment(s) described herein, the full copy-write request includes the source directory (received via the full backup request in Step 300) and the file-container map (produced in Step 306).

In Step 310, a full copy-write completion notice is received from the distributed workload framework manager. In one or many embodiment(s) described herein, the full copy-write completion notice may include one or more statements informing that the full copy-write request (submitted in Step 308) has been fulfilled. Fulfillment of the full copy-write request is illustrated and described in further detail with respect to FIGS. 4A-4C, below.

In Step 312, one or more container data files is/are synthesized. In one or many embodiment(s) described herein, any container data file may refer to a flat file that solely stores the data (without any metadata) corresponding to at least a subset of any number of file blocks representing said certain data encompassing one or more files sought to be protected through the full backup operation. Moreover, said synthesis of the container data file(s) is illustrated and described in further detail with respect to FIG. 3D, below.

Figure 3B:
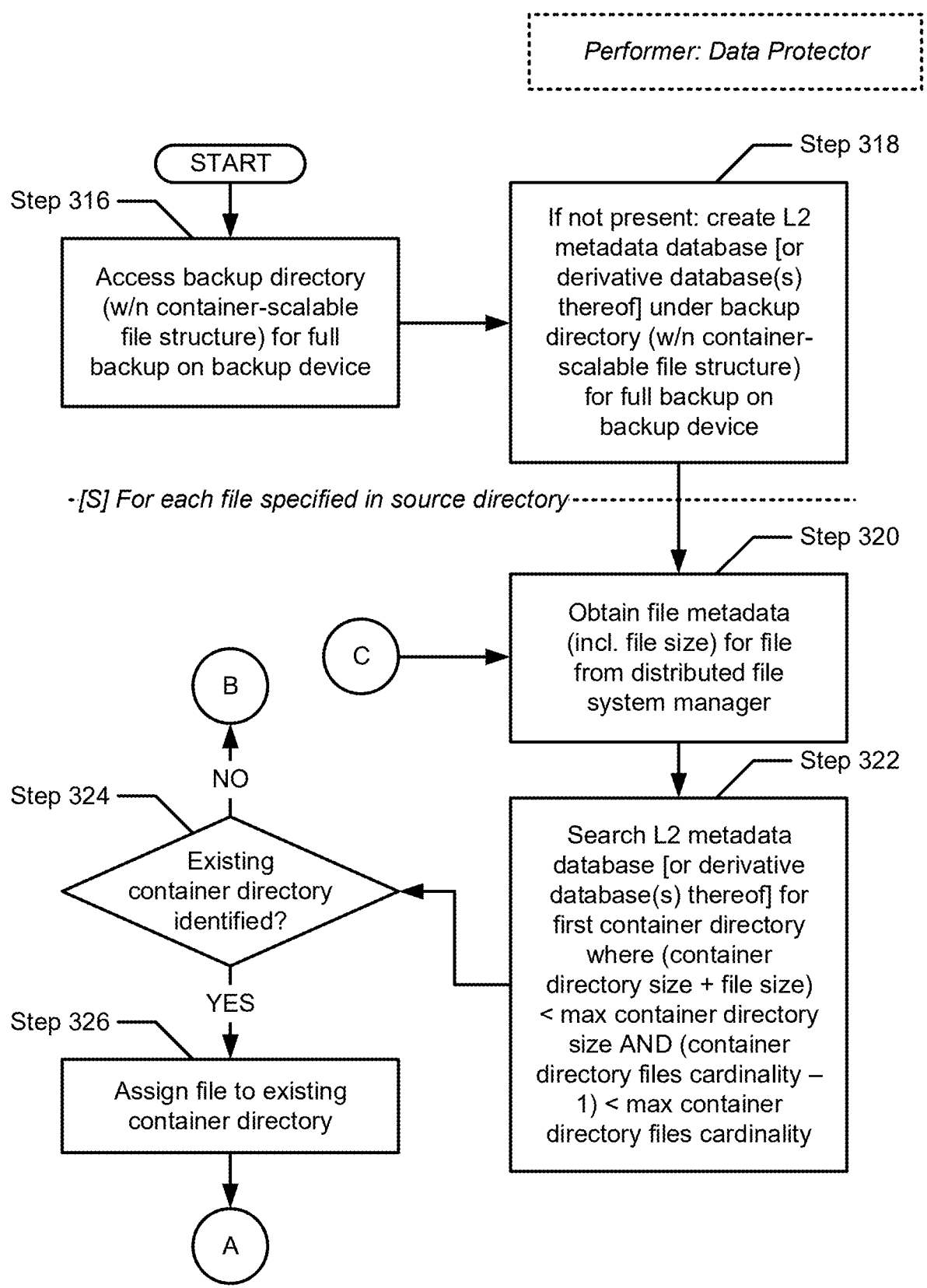
FIGS. 3B and 3C show a flowchart outlining a method for producing a file-container map in accordance with one or more embodiments described herein.
Figure 3C:
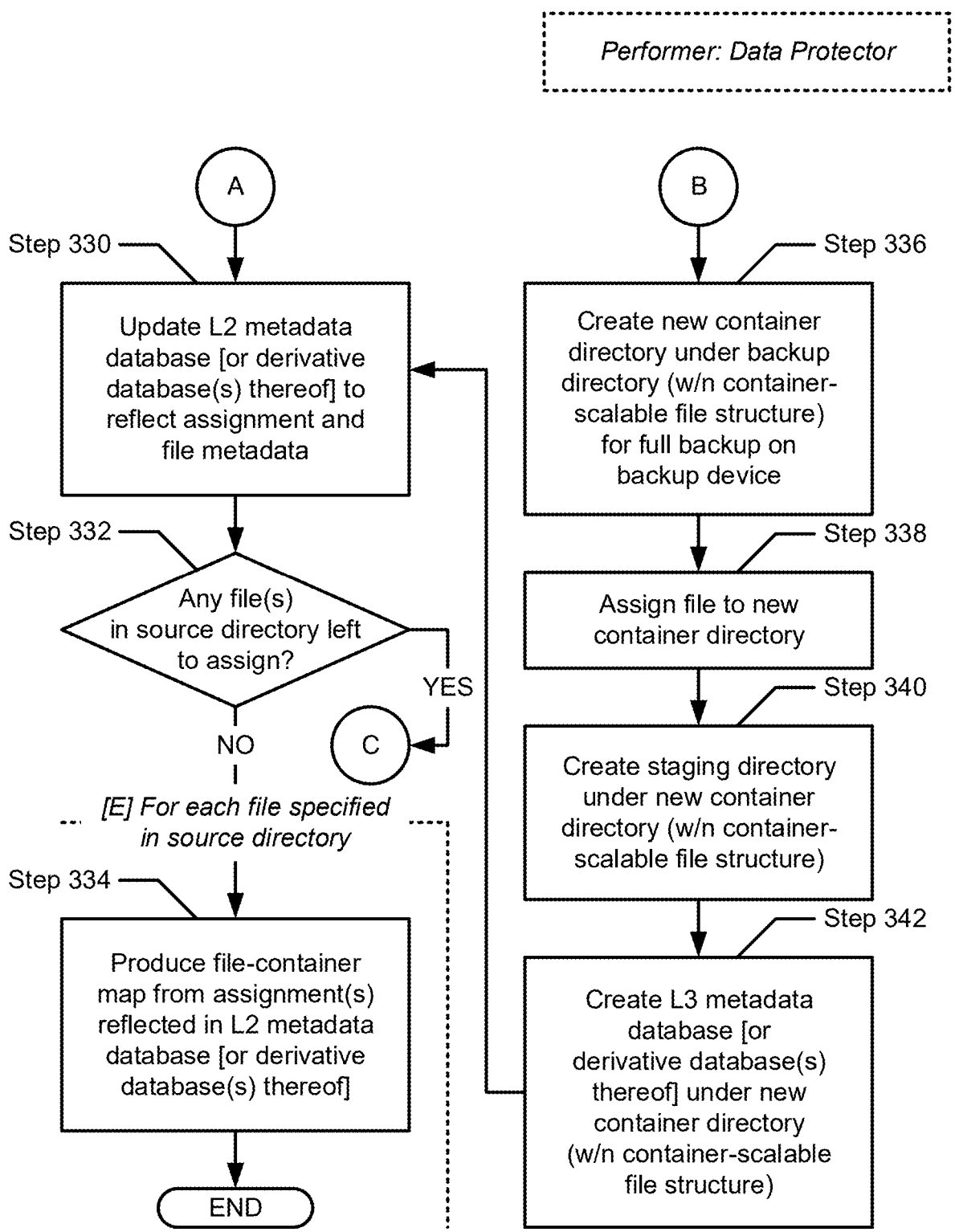

FIGS. 3B and 3C show a flowchart outlining a method for producing a file-container map in accordance with one or more embodiments described herein. The various steps outlined below may be performed by the data protector (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

In Step 316, the backup directory (created in FIG. 3A, Step 302) is accessed.

In Step 318, if not already present within the L2 of the container-scalable file structure, a L2 metadata database [or the derivative databases thereof—i.e., a backup permissions database, a backup root database, and a single backup metadata database (see e.g., FIG. 2C)] is/are created. In one or many embodiment(s) described herein, the backup permissions database may refer to a data repository configured to store and/or track any metadata concerning access and/or permissions information for any owner(s)/user(s) of the specified data protected through the (single) backup operation (e.g., full or incremental) associated with the backup directory (accessed in Step 316); the backup root database may refer to a data repository configured to store and/or track any metadata concerning any number of files protected through the (single) backup operation associated with the backup directory (accessed in Step 316); and the single backup metadata database may refer to a data repository configured to store and/or track any metadata concerning the (single) backup operation associated with the backup directory (accessed in Step 316). The L2 metadata database, meanwhile, may refer to a data repository configured to store and/or track the superset (or all) of the metadata maintained across the derivative databases thereof.

Hereinafter, a subset of the remaining steps (i.e., Steps 320, 322, 324, 326, 330, 332, 336, 338, 340, and 342) may be performed, iteratively as a whole, for each file specified in the source directory (received via the full backup request in FIG. 3A, Step 300). For example, a first iteration of the indicated remaining steps subset may be performed with respect to a first file specified in the source directory; thereafter, a second iteration of the indicated remaining steps subset may be performed with respect to a second file specified in the source directory; and so forth, including a last iteration of the indicated remaining steps subset that may be performed with respect to a last file specified in the source directory.

In Step 320, file metadata, for the file, is obtained from the distributed file system manager (see e.g., FIG. 1B). In one or many embodiment(s) described herein, the file metadata includes: (a) a filename for the file; (b) a file size for the file; and (c) a full path for the file on the distributed storage cluster. Said file metadata is not limited to the aforementioned specific examples.

In Step 322, the L2 metadata database [or any derivative database(s) thereof—i.e., the backup permissions database, the backup root database, and/or the single backup metadata database (see e.g., FIG. 2C)] is/are searched. In one or many embodiment(s) described herein, the search may be directed to identifying a first container directory that meets certain criteria. Said certain criteria includes the following conditions: (a) the sum of a container directory size for an existing container directory and the file size (obtained in Step 320) for the file falls below a maximum container directory size (i.e., a dynamically configured, user-defined threshold limiting the number of bytes any container directory stores); AND (b) one less than a container directory files cardinality (i.e., a number of files assigned to the existing container directory) falls below a maximum container directory files cardinality (i.e., another dynamically configured, user-defined threshold limiting the number of files any container directory stores).

In Step 324, a determination is made, based on the search (performed in Step 322), as to whether an existing container directory, within the container-scalable file structure and residing under backup directory (accessed in Step 316), has been identified. In one or many embodiment(s) described herein, if it is determined that an existing container directory has been identified, then the method proceeds to Step 326. On the other hand, in one or many other embodiment(s) described herein, if it is alternatively determined that no existing container directory has been identified, then the method alternatively proceeds to Step 336 (see e.g., FIG. 3C).

In Step 326, following the determination (made in Step 324) that an existing container directory has indeed been identified based on the search (performed in Step 322), the file is assigned to the existing container directory.

Hereinafter, the method proceeds to Step 330 (see e.g., FIG. 3C).

Turning to FIG. 3C, in Step 330, the L2 metadata database [or any derivative database(s) thereof—i.e., the backup permissions database, the backup root database, and/or the single backup metadata database (see e.g., FIG. 2C)] is/are updated. In one or many embodiment(s) described herein, said update may reflect the assignment of the file to the existing container directory (in Step 326) or the assignment of the file to a new container directory (in Step 338). Said update may further reflect any file metadata (obtained in Step 320).

In Step 332, a determination is made as to whether any file(s) remain to be assigned. In one or many embodiment(s) described herein, if it is determined that at least one file remains to be assigned, then the method proceeds to Step 320 (see e.g., FIG. 3B). On the other hand, in one or many other embodiment(s) described herein, if it is alternatively determined that zero files remain to be assigned, then the method alternatively proceeds to Step 334.

In Step 334, a file-container map is produced. In one or many embodiment(s) described herein, the file-container map may refer to a data structure at least conveying any assignment(s) (of any file(s) to an existing or new container directory within the container-scalable file structure). The file-container map may therefore be derived from information stored in the L2 metadata database [or any derivative database(s) thereof—i.e., the backup permissions database, the backup root database, and/or the single backup metadata database (see e.g., FIG. 2C)] (updated in Step 330). The file-container map may further convey a backup destination path identifying a location in the container-scalable file structure (see e.g., FIG. 2A) pertaining to a staging directory (residing under an existing or new container directory) dedicated to storing backup copies of said any file(s).

In Step 336, following the alternative determination (made in Step 324) that no existing container directory has been identified based on the search (performed in Step 322). a new container directory is created under the backup directory (accessed in Step 316). Accordingly, in one or many embodiment(s) described herein, the new container directory may reside within a second level (L2) of the container-scalable file structure (see e.g., FIG. 2A).

In Step 338, the file is assigned to the new container directory (created in Step 336).

In Step 340, a staging directory is created under the new container directory (created in Step 336). In one or many embodiment(s) described herein, the staging directory may reside within a third level (L3) of the container-scalable file structure (see e.g., FIG. 2A).

In Step 342, a L3 metadata database [or any derivative database(s) thereof—i.e., the backup index database and the backup attributes database (see e.g., FIG. 2D)] is/are created under the new container directory (created in Step 336). In one or many embodiment(s) described herein, the backup index database may refer to a data repository configured to store and/or track any metadata concerning any number of files assigned to the new container directory; and the backup attributes database may refer to a data repository configured to store and/or track any metadata concerning extended attributes information for any number of files assigned to the new container directory. The L3 metadata database, meanwhile, may refer to a data repository configured to store and/or track the superset (or all) of the metadata maintained across the derivative databases thereof.

Hereinafter, the method proceeds to Step 330 (described above).

Figure 3D:
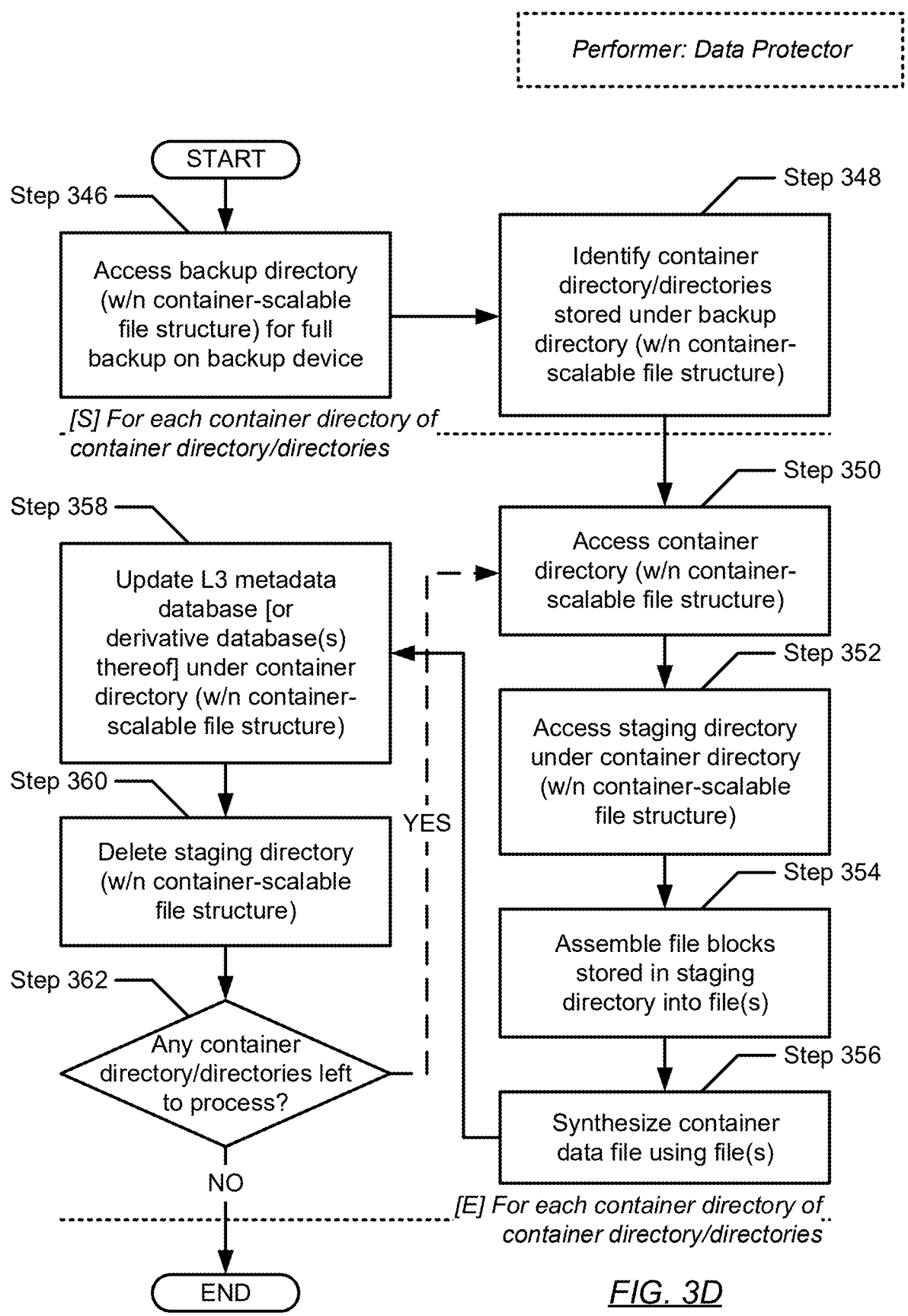
FIG. 3D shows a flowchart outlining a method for synthesizing container data files in accordance with one or more embodiments described herein.

FIG. 3D shows a flowchart outlining a method for synthesizing container data files in accordance with one or more embodiments described herein. The various steps outlined below may be performed by the data protector (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3D, in Step 346, the backup directory (created in FIG. 3A, Step 302) is accessed.

In Step 348, one or more container directories, residing under the backup directory (accessed in Step 346), is/are identified.

Hereinafter, the remaining steps (i.e., Steps 350, 352, 354, 356, 358, 360, and 362) may be performed, iteratively as a whole, for each container directory (identified in Step 348). For example, a first iteration of the indicated remaining steps may be performed with respect to a first container directory; thereafter, a second iteration of the indicated remaining steps may be performed with respect to a second container directory; and so forth, including a last iteration of the indicated remaining steps that may be performed with respect to a last container directory.

In Step 350, a container directory (identified in Step 348) is accessed.

In Step 352, a staging directory, residing under the container directory (accessed in Step 350), is accessed. In one or many embodiment(s) described herein, the staging directory may (at least temporarily) store one or more file blocks for any number of files assigned to the container directory (accessed in Step 350).

In Step 354, any file block(s), stored in the staging directory (accessed in Step 352), is assembled to form one or more files.

In Step 356, a container data file is synthesized using the file(s) (formed in Step 354).

In Step 358, the L3 database [or any derivative database(s) thereof—i.e., the backup index database and the backup attributes database (see e.g., FIG. 2D)], residing under the container directory (accessed in Step 350), is/are updated. In one or many embodiment(s) described herein, said update may reflect any file offset (and/or file block offset) and file size (and/or file block size) associated with the file(s) (formed in Step 354) with respect to their respective location within the container data file (synthesized in Step 356).

In Step 360, the staging directory (accessed in Step 352) is deleted.

In Step 362, a determination is made as to whether any container directory/directories remain to be processed. In one or many embodiment(s) described herein, if it is determined that at least one container directory remains to be processed, then the method proceeds to Step 350 (described above). On the other hand, if it is alternatively determined that zero container directories remain to be processed, then the method alternatively ends.

Figure 4A:
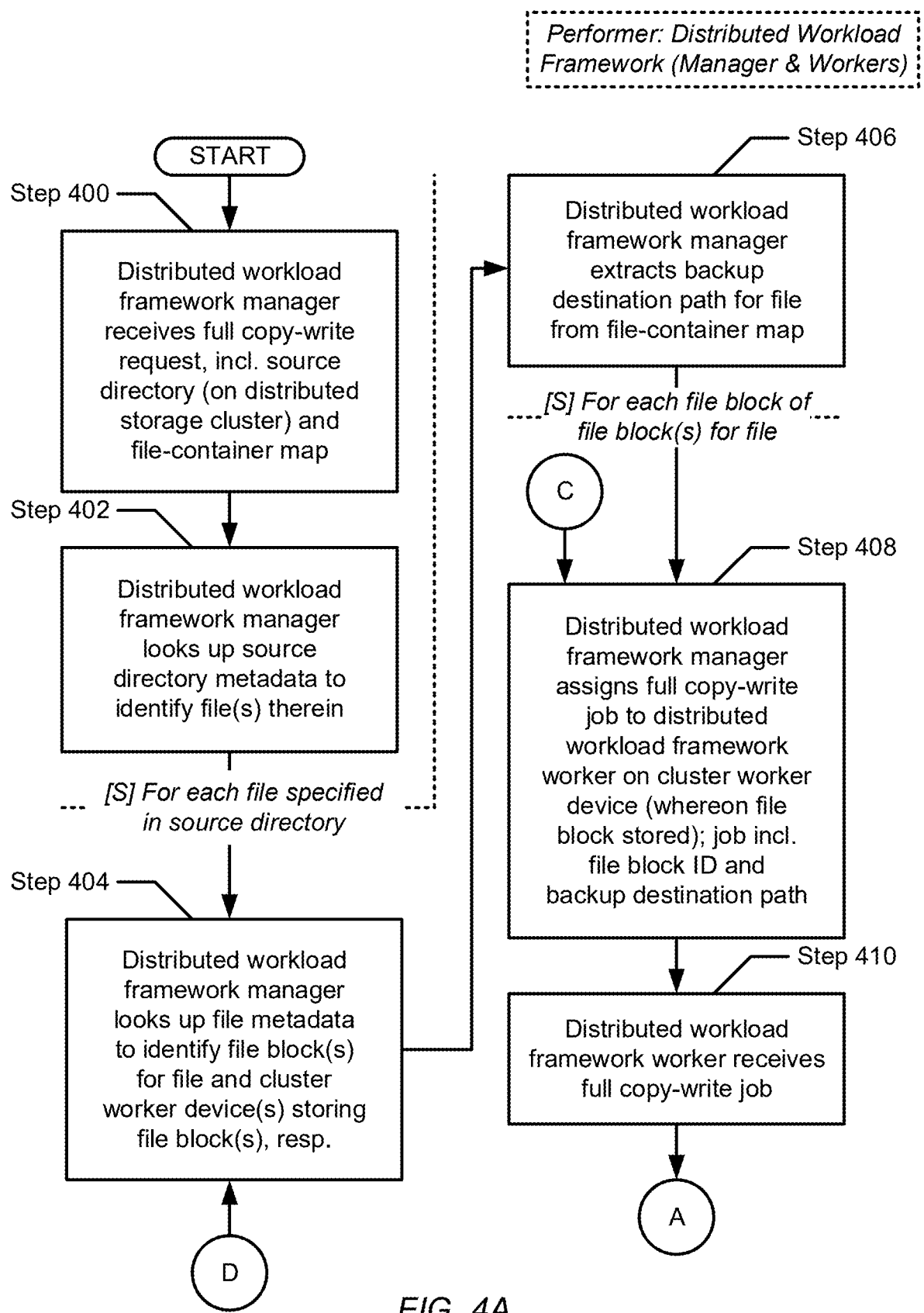
FIGS. 4A-4C show a flowchart outlining a method for processing a full copy-write request in accordance with one or more embodiments described herein.
Figure 4B:
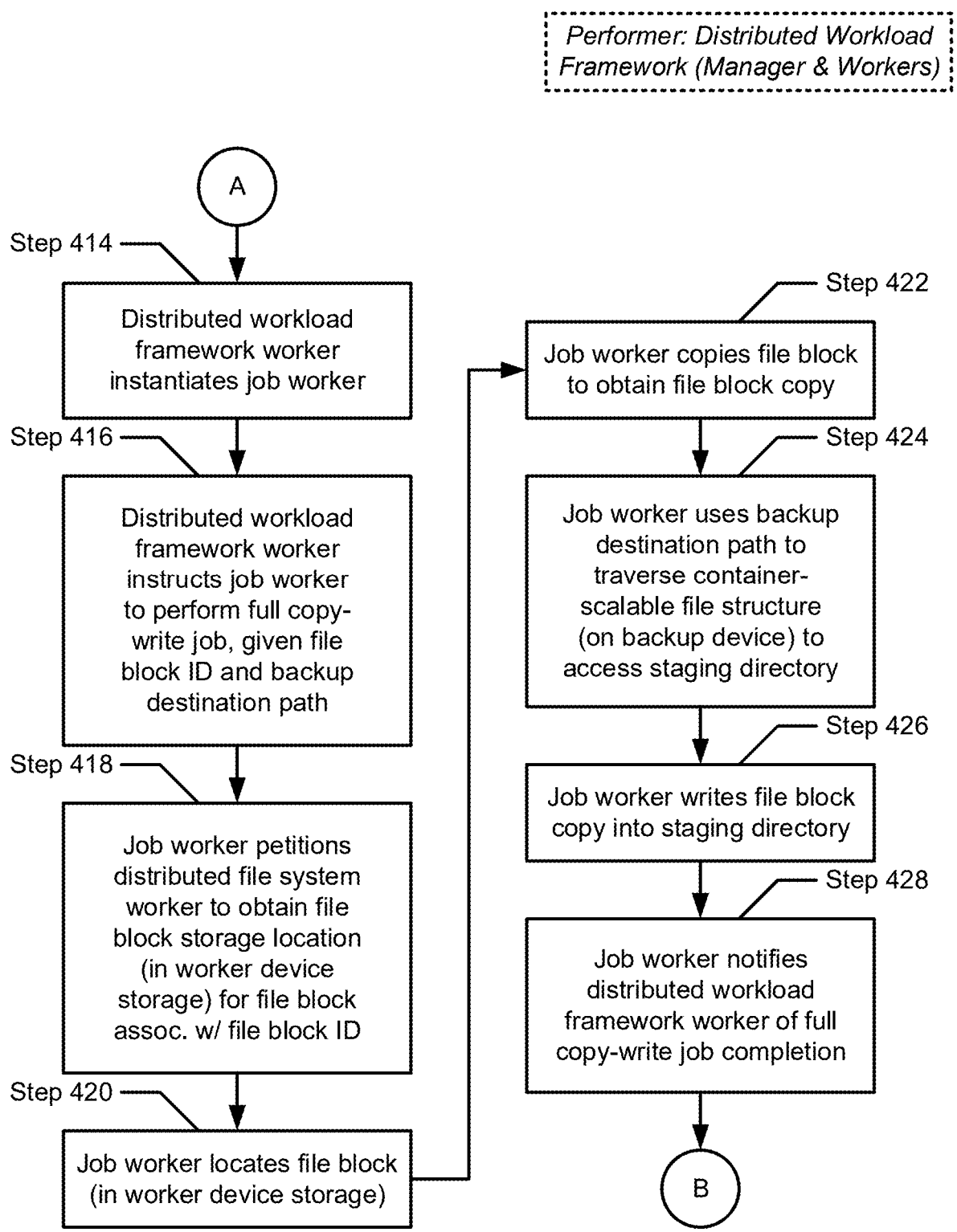
Figure 4C:
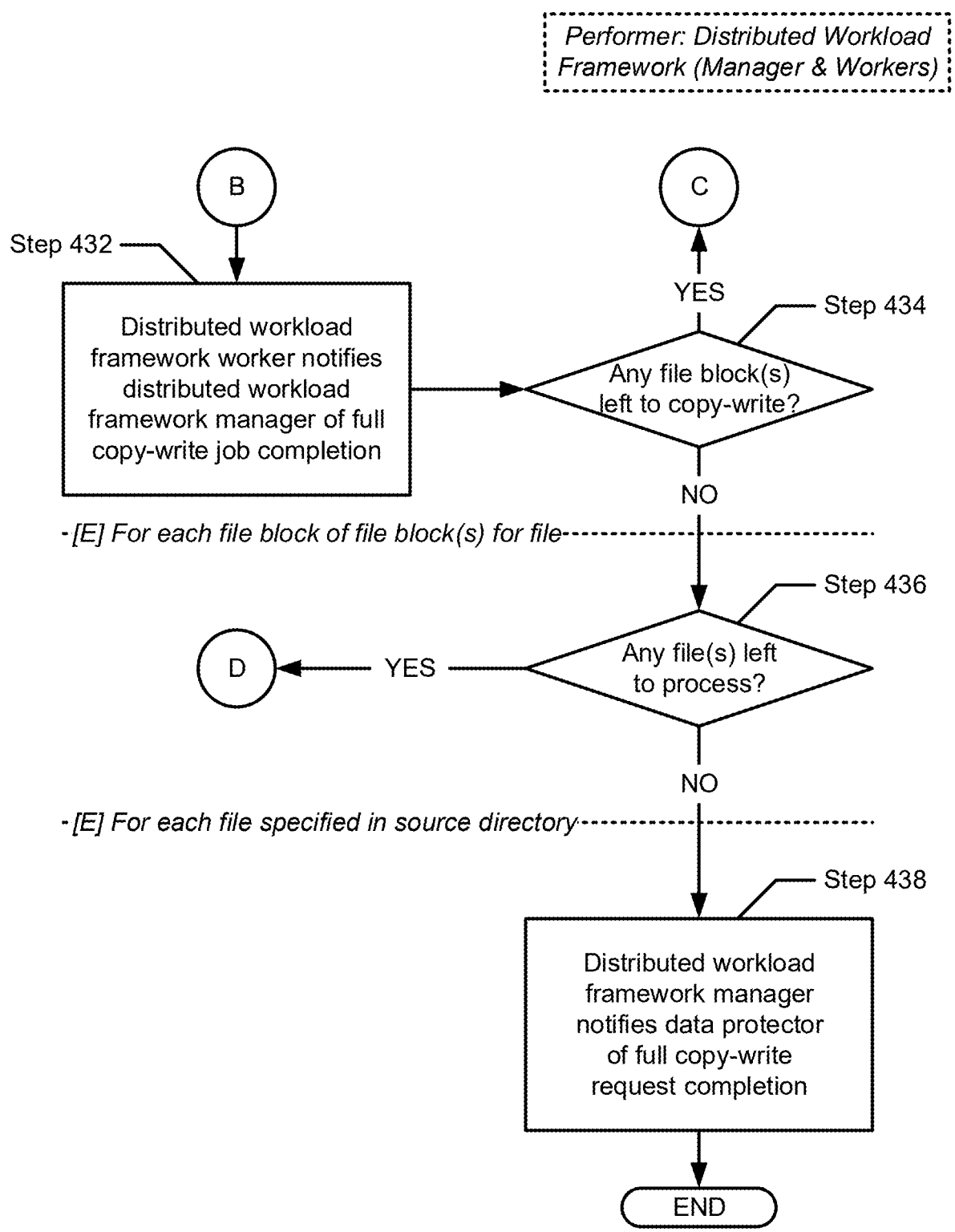

FIGS. 4A-4C show a flowchart outlining a method for processing a full copy-write request in accordance with one or more embodiments described herein. The various steps outlined below may be performed by a combination of the distributed workload framework manager and one or more distributed workload framework workers (see e.g., FIGS. 1B and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, the distributed workload framework manager receives a full copy-write request. In one or many embodiment(s) described herein, the full copy-write request includes a source directory (residing on the distributed storage cluster) and a file-container map.

In Step 402, the distributed workload framework manager searches any source directory metadata, pertaining to the source directory, to identify one or more files stored therein.

Hereinafter, a subset of the remaining steps (i.e., Steps 404, 406, 408, 410, 414, 416, 418, 420, 422, 424, 426, 428, 432, 434, and 436) may be performed, iteratively as a whole, for each file specified in the source directory (received via the full copy-write request in Step 400). For example, a first iteration of the indicated remaining steps subset may be performed with respect to a first file specified in the source directory; thereafter, a second iteration of the indicated remaining steps subset may be performed with respect to a second file specified in the source directory; and so forth, including a last iteration of the indicated remaining steps subset that may be performed with respect to a last file specified in the source directory.

In Step 404, the distributed workload framework manager looks up file metadata, pertaining to the file, to identify one or more file blocks of the file, as well as one or more cluster worker devices storing the file block(s), respectively.

In Step 406, the distributed workload framework manager extracts a backup destination path, for the file, from the file-container map. The backup destination path may refer to a character string uniquely identifying a location in the container-scalable file structure (see e.g., FIG. 2A) pertaining to a staging directory dedicated to storing backup copies.

Hereinafter, a subset of the remaining steps (i.e., Steps 408, 410, 414, 416, 418, 420, 422, 424, 426, 428, 432, and 434) may be performed, iteratively as a whole, for each file block (identified in Step 404) of the file. For example, a first iteration of the indicated remaining steps subset may be performed with respect to a first file block of the file; thereafter, a second iteration of the indicated remaining steps subset may be performed with respect to a second file block of the file; and so forth, including a last iteration of the indicated remaining steps subset that may be performed with respect to a last file block of the file.

In Step 408, the distributed workload framework manager assigns a full copy-write job to a distributed workload framework worker (see e.g., FIG. 1C) on a cluster worker device (identified in Step 404). The full copy-write job includes a file block ID for a file block (identified in Step 404) and the backup destination path (extracted in Step 406).

In Step 410, the distributed workload framework worker receives the full copy-write job (assigned thereto in Step 408).

Hereinafter, the method proceeds to Step 414 (see e.g., FIG. 4B).

Turning to FIG. 4B, in Step 414, the distributed workload framework worker instantiates a job worker. The job worker (e.g., a computing container) may refer to a standalone, lightweight virtualization environment within which a software application and its dependencies (e.g., libraries, binaries, tools, configuration files/settings, etc.) execute.

In Step 416, the distributed workload framework worker instructs the job worker (instantiated in Step 414) to perform the full copy-write job (received in Step 410). To fulfill the full copy-write job, said instructions include the file block ID for the file block and the backup destination path.

In Step 418, the job worker petitions the distributed file system worker (see e.g., FIG. 1C) in order to obtain a file block storage location for the file block. The file block storage location may reference a location in the worker device storage of the cluster worker device whereat the file block is stored.

In Step 420, the job worker locates the file block, in the worker device storage, using the file block storage location (petitioned for in Step 418).

In Step 422, the job worker copies the file block (located in Step 420) to obtain a file block copy.

In Step 424, the job worker traverses the container-scalable file structure (see e.g., FIG. 2A) using the backup destination path to arrive at (and access) the staging directory.

In Step 426, the job worker writes the file block copy (obtained in Step 422) into the staging directory (accessed in Step 424).

In Step 428, the job worker notifies the distributed workload framework worker concerning the completion of the full copy-write job (received in Step 410).

Hereinafter, the method proceeds to Step 432 (see e.g., FIG. 4C).

Turning to FIG. 4C, in Step 432, the distributed workload framework worker notifies the distributed workload framework manager concerning the completion of the full copy-write job (assigned thereto in Step 408).

In Step 434, a determination is made as to whether any file block(s) remain to be copy-written. In one or many embodiment(s) described herein, if it is determined that zero file blocks remain to be copy-written, then the method proceeds to Step 436. On the other hand, in one or many other embodiment(s) described herein, if it is alternatively determined that at least one file block remains to be copy-written, then the method alternatively proceeds to Step 408 (see e.g., FIG. 4A).

In Step 436, a determination is made as to whether any file(s) remain to be processed. In one or many embodiment(s) described herein, if it is determined that zero files remain to be processed, then the method proceeds to Step 438. On the other hand, in one or many other embodiment(s) described herein, if it is alternatively determined that at least one file remains to be processed, then the method alternatively proceeds to Step 404 (see e.g., FIG. 4A).

In Step 438, the distributed workload framework manager notifies the data protector concerning completion of the full copy-write request (received in Step 400).

Figure 5A:
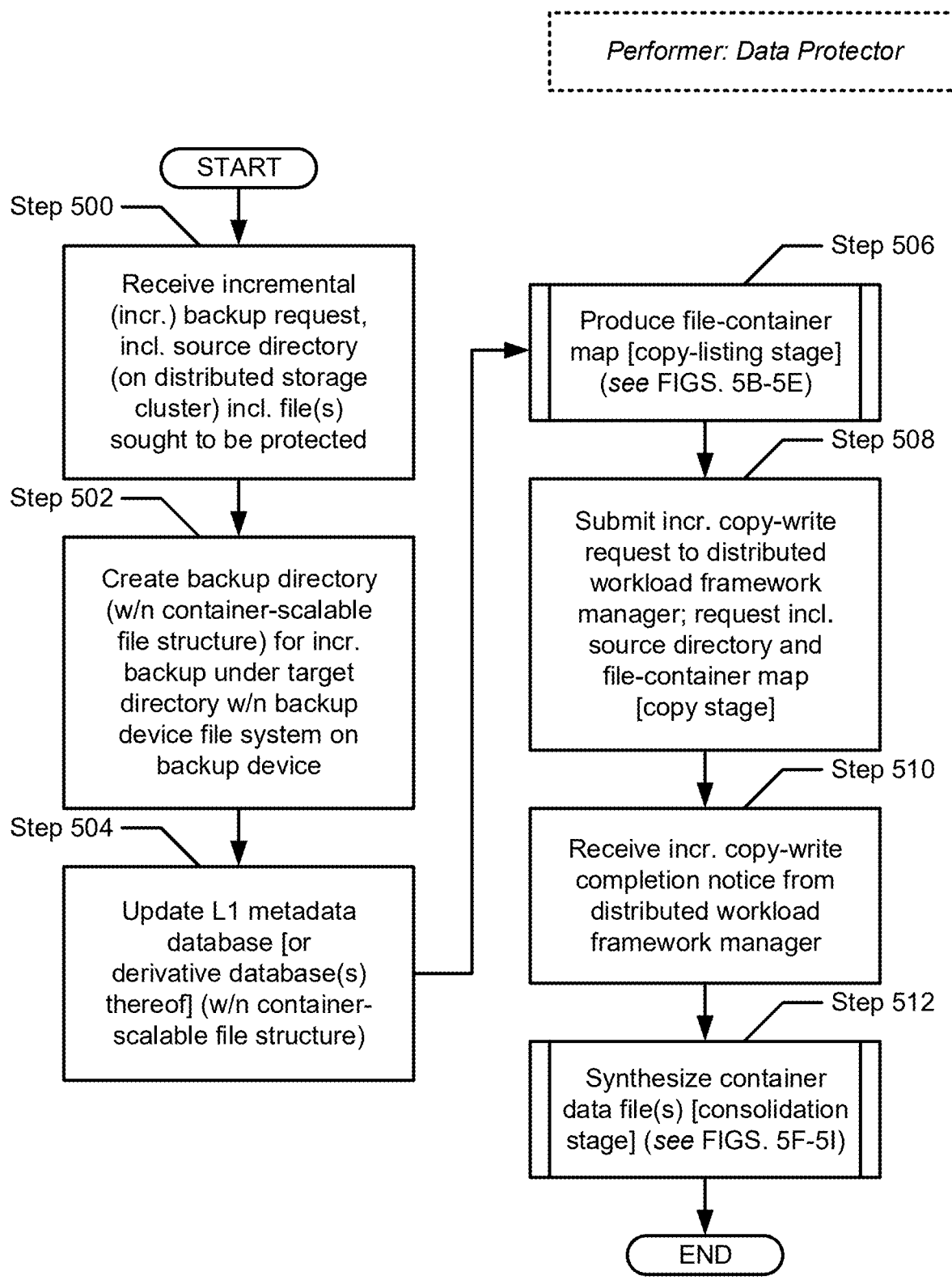
FIG. 5A shows a flowchart outlining a method for processing an incremental backup request in accordance with one or more embodiments described herein.

FIG. 5A shows a flowchart outlining a method for processing an incremental backup request in accordance with one or more embodiments described herein. The various steps outlined below may be performed by the data protector (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, an incremental backup request is received. In one or many embodiment(s) described herein, the incremental backup request may pertain to performing an incremental backup operation targeting certain data stored on the distributed storage cluster. Further, the incremental backup request may specify a source directory including said certain data, where said certain data may encompass one or more files sought to be protected through the incremental backup operation.

In Step 502, a backup directory, corresponding to the prospective incremental backup operation associated with the incremental backup request (received in Step 500), is created. In one or many embodiment(s) described herein, the backup directory may reside within a first level (L1) of the container-scalable file structure (see e.g., FIG. 2A). The container-scalable file structure, in turn, resides under, and is thus accessible through, a target directory within a backup device file system on the backup device (see e.g., FIG. 1D).

In Step 504, a L1 metadata database [or the derivative database thereof—i.e., a collective backup metadata database (see e.g., FIG. 2B)], residing under the target directory (mentioned in Step 502), is updated. In one or many embodiment(s) described herein, the L1 metadata database (or the derivative database thereof) may refer to a data repository configured to store and/or track any metadata concerning each backup operation (e.g., full or incremental) that had targeted any specified data stored on the distributed storage cluster. Said update may reflect one or more metadata items (see e.g., FIG. 2B) descriptive of the incremental backup operation.

In Step 506, a file-container map is produced. In one or many embodiment(s) described herein, the file-container map may refer to a data structure at least conveying any assignment(s) (of any file(s)—specified in the source directory (received via the incremental backup request in Step 500)—to one or more container directories to be created within the container-scalable file structure for the incremental backup operation). The file-container map may further convey a backup destination path identifying a location in the container-scalable file structure (see e.g., FIG. 2A) pertaining to a staging directory dedicated to storing backup copies of any file(s) specified in the source directory. Said production of the file-container map is illustrated and described in further detail with respect to FIGS. 5B-5E, below.

In Step 508, an incremental copy-write request is submitted to the distributed workload framework manager (see e.g., FIG. 1B). In one or many embodiment(s) described herein, the incremental copy-write request includes the source directory (received via the incremental backup request in Step 500) and the file-container map (produced in Step 506).

In Step 510, an incremental copy-write completion notice is received from the distributed workload framework manager. In one or many embodiment(s) described herein, the incremental copy-write completion notice may include one or more statements informing that the incremental copy-write request (submitted in Step 508) has been fulfilled. Fulfillment of the incremental copy-write request is illustrated and described in further detail with respect to FIGS. 6A-6C, below.

In Step 512, one or more container data files is/are synthesized. In one or many embodiment(s) described herein, any container data file may refer to a flat file that solely stores the data (without any metadata) corresponding to at least a subset of any number of file blocks representing said certain data encompassing one or more files sought to be protected through the full backup operation. Moreover, said synthesis of the container data file(s) is illustrated and described in further detail with respect to FIGS. 5F-5I, below.

FIGS. 5B-5E show a flowchart outlining a method for producing a file-container map in accordance with one or more embodiments described herein. The various steps outlined below may be performed by the data protector (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Figure 5B:
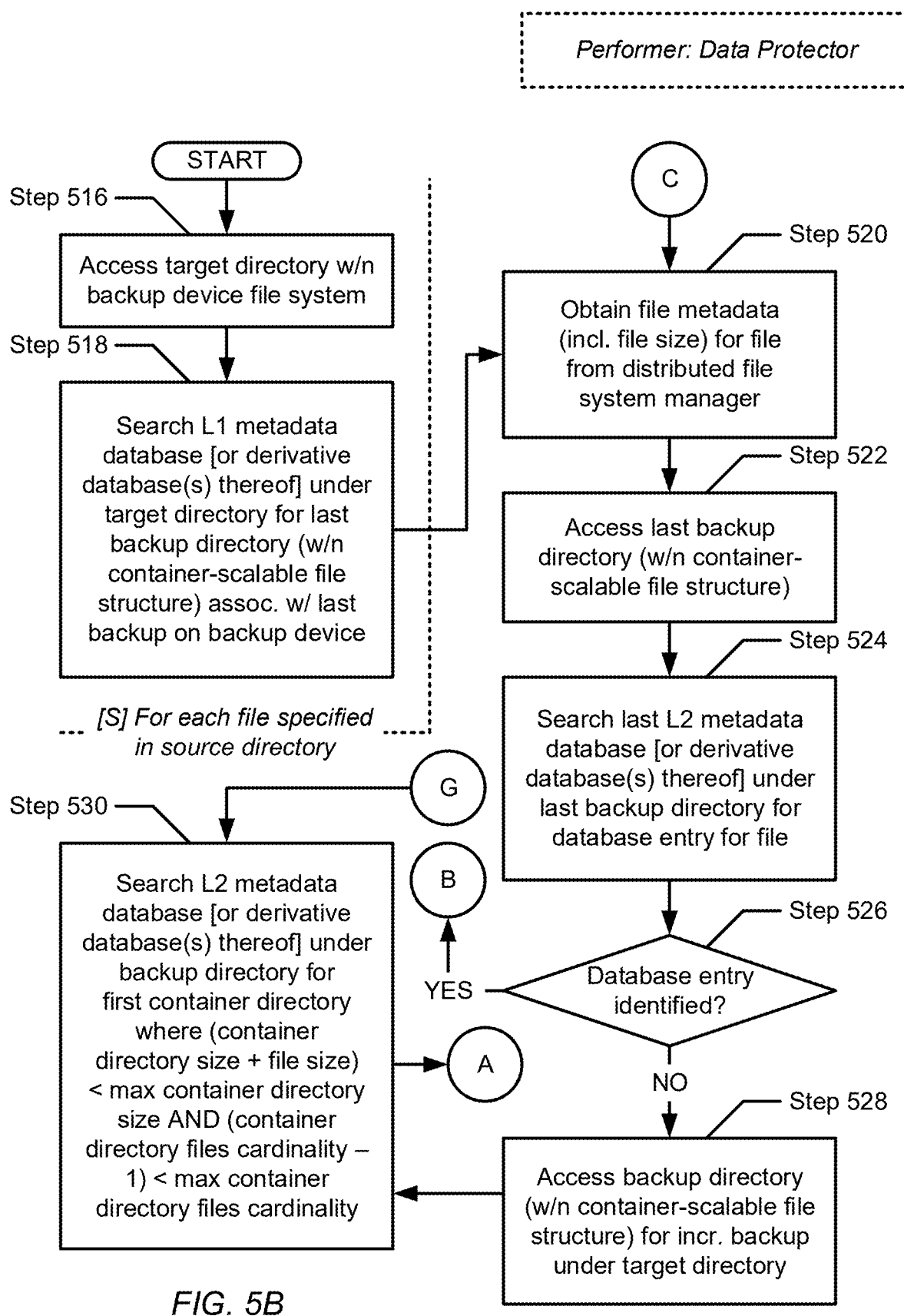
FIGS. 5B-5E show a flowchart outlining a method for producing a file-container map in accordance with one or more embodiments described herein.

Turning to FIG. 5B, in Step 516, the target directory, within a backup device file system of the backup device (see e.g., FIG. 1D), is accessed.

In Step 518, the L1 metadata database [or the derivative database thereof—i.e., a collective backup metadata database (see e.g., FIG. 2B)], residing under the target directory (accessed in Step 516), is searched. In one or many embodiment(s) described herein, the search may be directed to identifying a last backup directory associated with a last backup operation performed concerning data stored on the distributed storage cluster.

Hereinafter, a subset of the remaining steps (i.e., Steps 520, 522, 524, 526, 528, 530, 534, 536, 538, 540, 542, 544, 546, 548, 552, 554, 556, 558, 560, 562, 564, 566, 570, 572, 576, and 578) may be performed, iteratively as a whole, for each file specified in the source directory (received via the incremental backup request in FIG. 5A, Step 500). For example, a first iteration of the indicated remaining steps subset may be performed with respect to a first file specified in the source directory; thereafter, a second iteration of the indicated remaining steps subset may be performed with respect to a second file specified in the source directory; and so forth, including a last iteration of the indicated remaining steps subset that may be performed with respect to a last file specified in the source directory.

In Step 520, file metadata, for the file, is obtained from the distributed file system manager (see e.g., FIG. 1B). In one or many embodiment(s) described herein, the file metadata includes: (a) a filename for the file; (b) a file size for the file; and (c) a full path for the file on the distributed storage cluster. Said file metadata is not limited to the aforementioned specific examples.

In Step 522, the last backup directory (identified in Step 518) is accessed.

In Step 524, the L2 metadata database [or any derivative database(s) thereof—i.e., the backup permissions database, the backup root database, and/or the single backup metadata database (see e.g., FIG. 2C)], residing under the last backup directory (accessed in Step 522), is/are searched. In one or many embodiment(s) described herein, the search may be directed to an attempt at identifying a database entry corresponding to the file.

In Step 526, a determination is made, based on the search (performed in Step 524), as to whether a database entry has been identified. In one or many embodiment(s) described herein, if it is determined that no database entry has been identified, then the method proceeds to Step 528. On the other hand, in one or many other embodiment(s) described herein, if it is alternatively determined that a database entry has been identified, then the method alternatively proceeds to Step 552 (see e.g., FIG. 5D).

In Step 528, following the determination (made in Step 526) that no database entry has been identified based on the search (performed in Step 524), the backup directory (created in FIG. 5A, Step 502) is accessed.

In Step 530, the L2 metadata database [or any derivative database(s) thereof—i.e., the backup permissions database, the backup root database, and/or the single backup metadata database (see e.g., FIG. 2C)], residing under the backup directory (accessed in Step 528), is/are searched. In one or many embodiment(s) described herein, the search may be directed to identifying a first container directory that meets certain criteria. Said certain criteria includes the following conditions: (a) the sum of a container directory size for an existing container directory and the file size (obtained in Step 520) for the file falls below a maximum container directory size (i.e., a dynamically configured, user-defined threshold limiting the number of bytes any container directory stores); AND (b) one less than a container directory files cardinality (i.e., a number of files assigned to the existing container directory) falls below a maximum container directory files cardinality (i.e., another dynamically configured, user-defined threshold limiting the number of files any container directory stores).

Hereinafter, the method proceeds to Step 534 (see e.g., FIG. 5C).

Figure 5C:
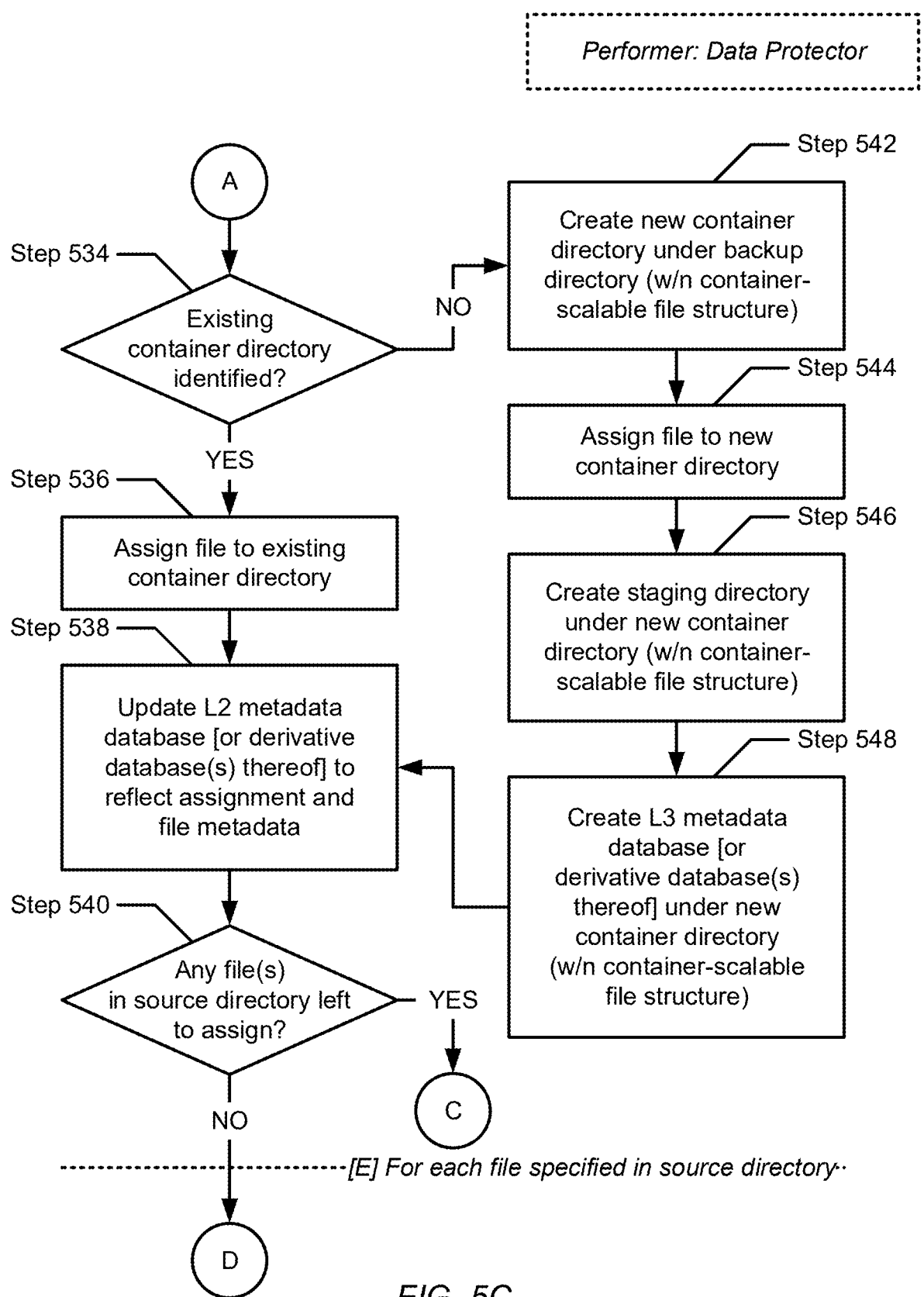

Turning to FIG. 5C, in Step 534, a determination is made, based on the search (performed in Step 530), as to whether an existing container directory, within the container-scalable file structure and residing under backup directory (accessed in Step 528), has been identified. In one or many embodiment(s) described herein, if it is determined that an existing container directory has been identified, then the method proceeds to Step 536. On the other hand, in one or many other embodiment(s) described herein, if it is alternatively determined that no existing container directory has been identified, then the method alternatively proceeds to Step 542.

In Step 536, following the determination (made in Step 534) that an existing container directory has indeed been identified based on the search (performed in Step 530), the file is assigned to the existing container directory.

In Step 538, the L2 metadata database [or any derivative database(s) thereof—i.e., the backup permissions database, the backup root database, and/or the single backup metadata database (see e.g., FIG. 2C)], residing under the backup directory (accessed in Step 528), is/are updated. In one or many embodiment(s) described herein, said update may reflect the assignment of the file to the existing container directory (in Step 536) or the assignment of the file to a new container directory (in Step 544). Said update may further reflect any file metadata (obtained in Step 520).

In Step 540, a determination is made as to whether any file(s) remain to be assigned. In one or many embodiment(s) described herein, if it is determined that at least one file remains to be assigned, then the method proceeds to Step 520 (see e.g., FIG. 5B). On the other hand, in one or many other embodiment(s) described herein, if it is alternatively determined that zero files remain to be assigned, then the method alternatively proceeds to Step 574 (see e.g., FIG. 5E).

In Step 542, following the alternative determination (made in Step 534) that no existing container directory has been identified based on the search (performed in Step 530), a new container directory is created under the backup directory (accessed in Step 528). Accordingly, in one or many embodiment(s) described herein, the new container directory may reside within a second level (L2) of the container-scalable file structure (see e.g., FIG. 2A).

In Step 544, the file is assigned to the new container directory (created in Step 542).

In Step 546, a staging directory is created under the new container directory (created in Step 542). In one or many embodiment(s) described herein, the staging directory may reside within a third level (L3) of the container-scalable file structure (see e.g., FIG. 2A).

In Step 548, a L3 metadata database [or any derivative database(s) thereof—i.e., the backup index database and the backup attributes database (see e.g., FIG. 2D)] is/are created under the new container directory (created in Step 542). In one or many embodiment(s) described herein, the backup index database may refer to a data repository configured to store and/or track any metadata concerning any number of files assigned to the new container directory; and the backup attributes database may refer to a data repository configured to store and/or track any metadata concerning extended attributes information for any number of files assigned to the new container directory. The L3 metadata database, meanwhile, may refer to a data repository configured to store and/or track the superset (or all) of the metadata maintained across the derivative databases thereof.

Hereinafter, the method proceeds to Step 538 (described above).

Figure 5D:
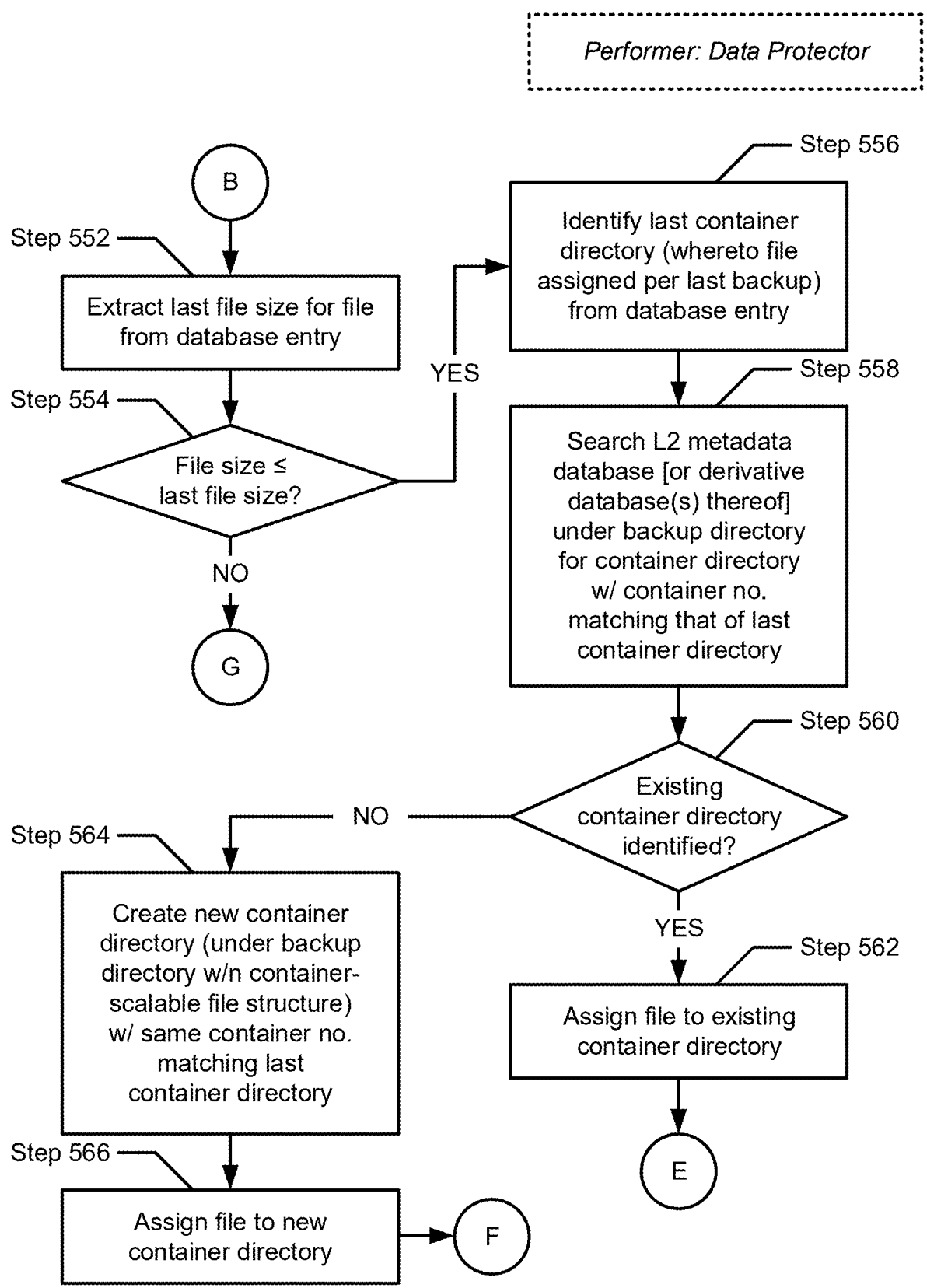

Turning to FIG. 5D, in Step 552, following the alternative determination (made in Step 526) that a database entry has been identified based on the search (performed in Step 524), a last file size, for the file, is extracted from the database entry. In one or many embodiment(s) described herein, the last file size may refer to a file size of the file during the last backup operation.

In Step 554, a determination is made as to whether the file size (obtained in Step 520) is less than or equal to the last file size (extracted in Step 522). In one or many embodiment(s) described herein, if it is determined that the file size is at most equal to the last file size, then the method proceeds to Step 556. On the other hand, in one or many other embodiment(s) described herein, if it is alternatively determined that the file size exceeds the last file size, then the method alternatively proceeds to Step 530 (see e.g., FIG. 5B).

In Step 556, following the determination (made in Step 554) that the file size (obtained in Step 520) is less than or equal to the last file size (extracted in Step 522), a last container directory is identified from the database entry. In one or many embodiment(s) described herein, the last container directory may refer to a container directory, residing under the last backup directory (accessed in Step 522), to which the file had been assigned during the last backup operation.

In Step 558, the L2 metadata database [or any derivative database(s) thereof—i.e., the backup permissions database, the backup root database, and/or the single backup metadata database (see e.g., FIG. 2C)], residing under the backup directory (accessed in Step 528), is/are searched. In one or many embodiment(s) described herein, the search may be directed to attempting to identify a container directory, residing under the backup directory, having a container number matching that of the last container directory (identified in Step 556).

In Step 560, a determination is made, based on the search (performed in Step 558), as to whether an existing container directory, residing under the backup directory (accessed in Step 528), has been identified. In one or many embodiment(s) described herein, if it is determined that an existing container directory has been identified, then the method proceeds to Step 562. On the other hand, in one or many other embodiment(s) described herein, if it is alternatively determined that no existing container directory has been identified, then the method alternatively proceeds to Step 564.

In Step 562, following the determination (made in Step 560) that an existing container directory, residing under the backup directory (accessed in Step 528), has been identified based on the search (performed in Step 558), the file is assigned to the existing container directory.

Hereinafter, the method proceeds to Step 570 (see e.g., FIG. 5E).

In Step 564, following the alternative determination (made in Step 560) that no existing container directory has been identified based on the search (performed in Step 528), a new container directory is created under the backup directory (accessed in Step 528). Accordingly, in one or many embodiment(s) described herein, the new container directory may reside within a second level (L2) of the container-scalable file structure (see e.g., FIG. 2A). Further, the new container directory is assigned a container number matching that of the last container directory (identified in Step 556).

In Step 566, the file is assigned to the new container directory (created in Step 564).

Hereinafter, the method proceeds to Step 576 (see e.g., FIG. 5E).

Figure 5E:
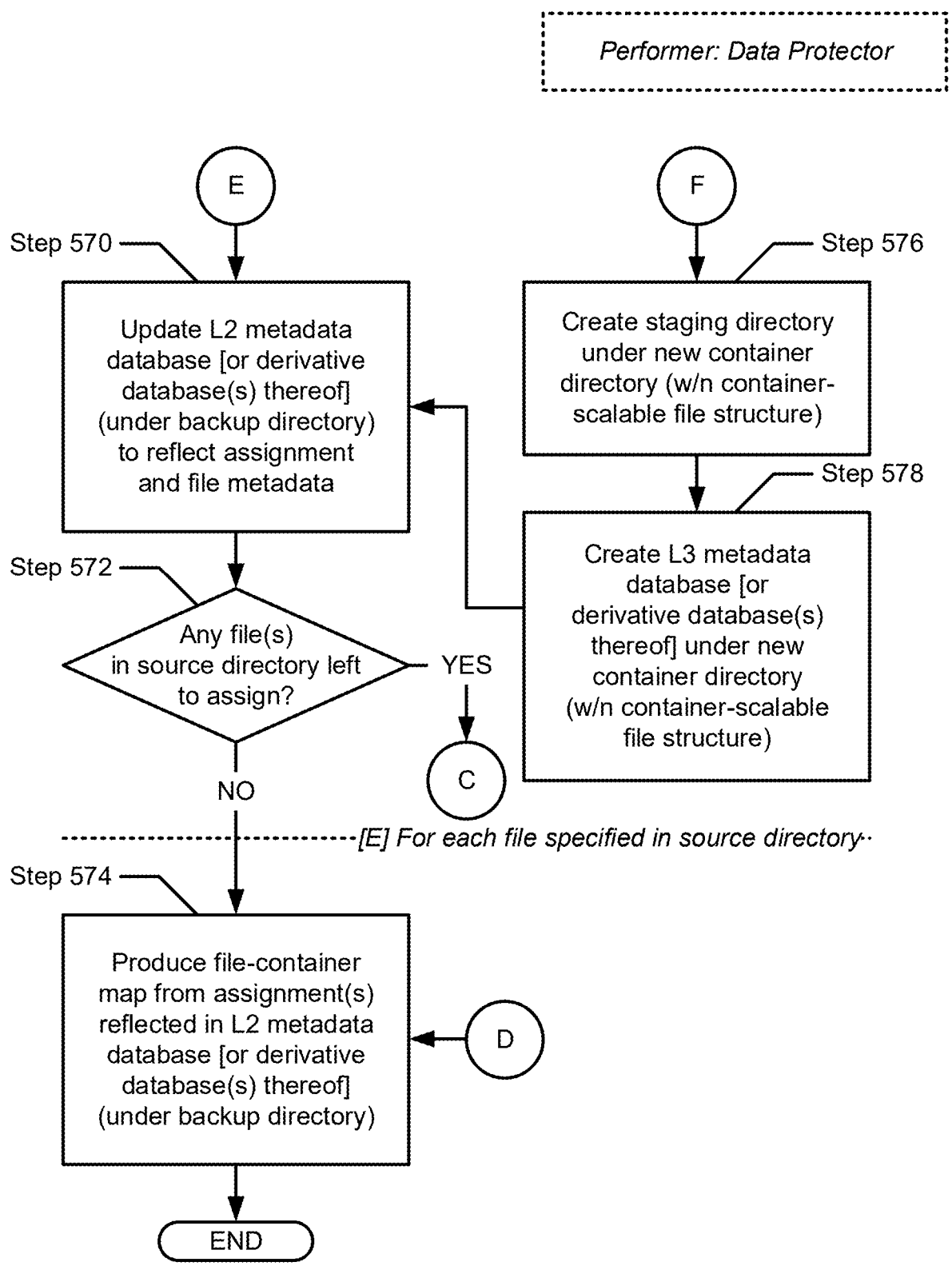

Turning to FIG. 5E, in Step 570, the L2 metadata database [or any derivative database(s) thereof—i.e., the backup permissions database, the backup root database, and/or the single backup metadata database (see e.g., FIG. 2C)], residing under the backup directory (accessed in Step 528), is/are updated. Said update may reflect the assignment of the file to the existing container directory (in Step 562) or the assignment of the file to the new container directory (in Step 566). Said update may further reflect any file metadata (obtained in Step 520).

In Step 572, a determination is made as to whether any file(s) remain to be assigned. In one or many embodiment(s) described herein, if it is determined that at least one file remains to be assigned, then the method proceeds to Step 520 (see e.g., FIG. 5B). On the other hand, in one or many other embodiment(s) described herein, if it is alternatively determined that zero files remain to be assigned, then the method alternatively proceeds to Step 574.

In Step 576, a staging directory is created under the new container directory (created in Step 566). In one or many embodiment(s) described herein, the staging directory may reside within a third level (L3) of the container-scalable file structure (see e.g., FIG. 2A).

In Step 578, the L3 metadata database [or any derivative database(s) thereof—i.e., the backup index database and the backup attributes database (see e.g., FIG. 2D)] is/are created under the new container directory (created in Step 566). In one or many embodiment(s) described herein, the backup index database may refer to a data repository configured to store and/or track any metadata concerning any number of files assigned to the new container directory; and the backup attributes database may refer to a data repository configured to store and/or track any metadata concerning extended attributes information for any number of files assigned to the new container directory. The L3 metadata database, meanwhile, may refer to a data repository configured to store and/or track the superset (or all) of the metadata maintained across the derivative databases thereof.

Hereinafter, the method proceeds to Step 570 (described above).

In Step 574, following the determination (made in Step 572) that zero files remain to be assigned, a file-container map is produced. In one or many embodiment(s) described herein, the file-container map may refer to a data structure at least conveying any assignment(s) (of any file(s) to an existing or new container directory within the container-scalable file structure). The file-container map may therefore be derived from information stored in the L2 metadata database [or any derivative database(s) thereof—i.e., the backup permissions database, the backup root database, and/or the single backup metadata database (see e.g., FIG. 2C)] (updated in Step 570). The file-container map may further convey a backup destination path identifying a location in the container-scalable file structure (see e.g., FIG. 2A) pertaining to a staging directory (residing under an existing or new container directory) dedicated to storing backup copies of said any file(s).

FIGS. 5F-5I show a flowchart outlining a method for synthesizing container data files in accordance with one or more embodiments described herein. The various steps outlined below may be performed by the data protector (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Figure 5F:
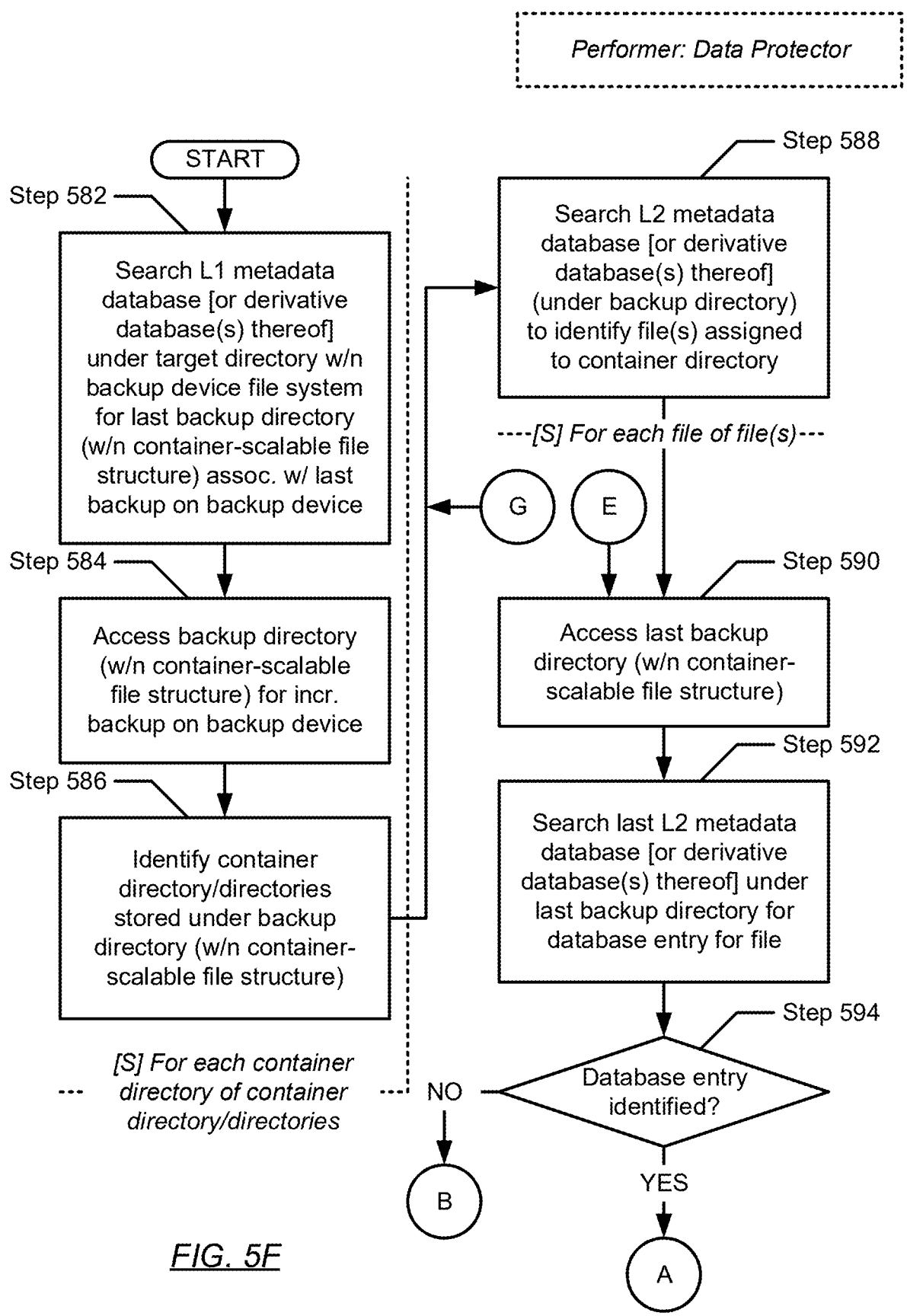
FIGS. 5F-5I show a flowchart outlining a method for synthesizing container data files in accordance with one or more embodiments described herein.

Turning to FIG. 5F, in Step 582, the L1 metadata database [or the derivative database thereof—i.e., a collective backup metadata database (see e.g., FIG. 2B)], residing under the target directory (accessed in Step 516), is searched. In one or many embodiment(s) described herein, the search may be directed to identifying a last backup directory associated with a last backup operation performed concerning data stored on the distributed storage cluster.

In Step 584, the backup directory (created in FIG. 5A, Step 502) is accessed.

In Step 586, one or more container directories, residing under the backup directory (accessed in Step 584), is/are identified.

Hereinafter, the remaining steps (i.e., Steps 588, 590, 592, 594, 598, 598A, 598B, 598C, 598D, 598E, 598F, 598G, 598H, 598I, 598J, 598K, 598L, 598M, 598N, 598O, 598P, 598Q, 598R, 598S, and 598T) may be performed, iteratively as a whole, for each container directory (identified in Step 586). For example, a first iteration of the indicated remaining steps may be performed with respect to a first container directory; thereafter, a second iteration of the indicated remaining steps may be performed with respect to a second container directory; and so forth, including a last iteration of the indicated remaining steps that may be performed with respect to a last container directory.

In Step 588, the L2 metadata database [or any derivative database(s) thereof—i.e., the backup permissions database, the backup root database, and/or the single backup metadata database (see e.g., FIG. 2C)], residing under the backup directory (accessed in Step 584), is/are searched. In one or many embodiment(s) described herein, the search may be directed to identifying one or more files that had been assigned to the container directory.

Hereinafter, a subset of the remaining steps (i.e., Steps 590, 592, 594, 598, 598A, 598B, 598C, 598D, 598E, 598F, 598G, 598H, 598I, 598J, 598K, and 598L) may be performed, iteratively as a whole, for each file of the file(s) (identified in Step 588) that had been assigned to the container directory. For example, a first iteration of the indicated remaining steps subset may be performed with respect to a first file assigned to the container directory; thereafter, a second iteration of the indicated remaining steps subset may be performed with respect to a second file assigned to the container directory; and so forth, including a last iteration of the indicated remaining steps subset that may be performed with respect to a last file assigned to the container directory.

In Step 590, the last backup directory (identified in Step 582) is accessed.

In Step 592, the L2 metadata database [or any derivative database(s) thereof—i.e., the backup permissions database, the backup root database, and/or the single backup metadata database (see e.g., FIG. 2C)], residing under the last backup directory (accessed in Step 590), is/are searched. In one or many embodiment(s) described herein, the search may be directed to an attempt at identifying a database entry corresponding to the file.

In Step 594, a determination is made, based on the search (performed in Step 592), as to whether a database entry has been identified. In one or many embodiment(s) described herein, if it is determined that no database entry has been identified, then the method proceeds to Step 598M (see e.g., FIG. 5H). On the other hand, in one or many other embodiment(s) described herein, if it is alternatively determined that a database entry has been identified, then the method alternatively proceeds to Step 598 (see e.g., FIG. 5G).

Figure 5G:
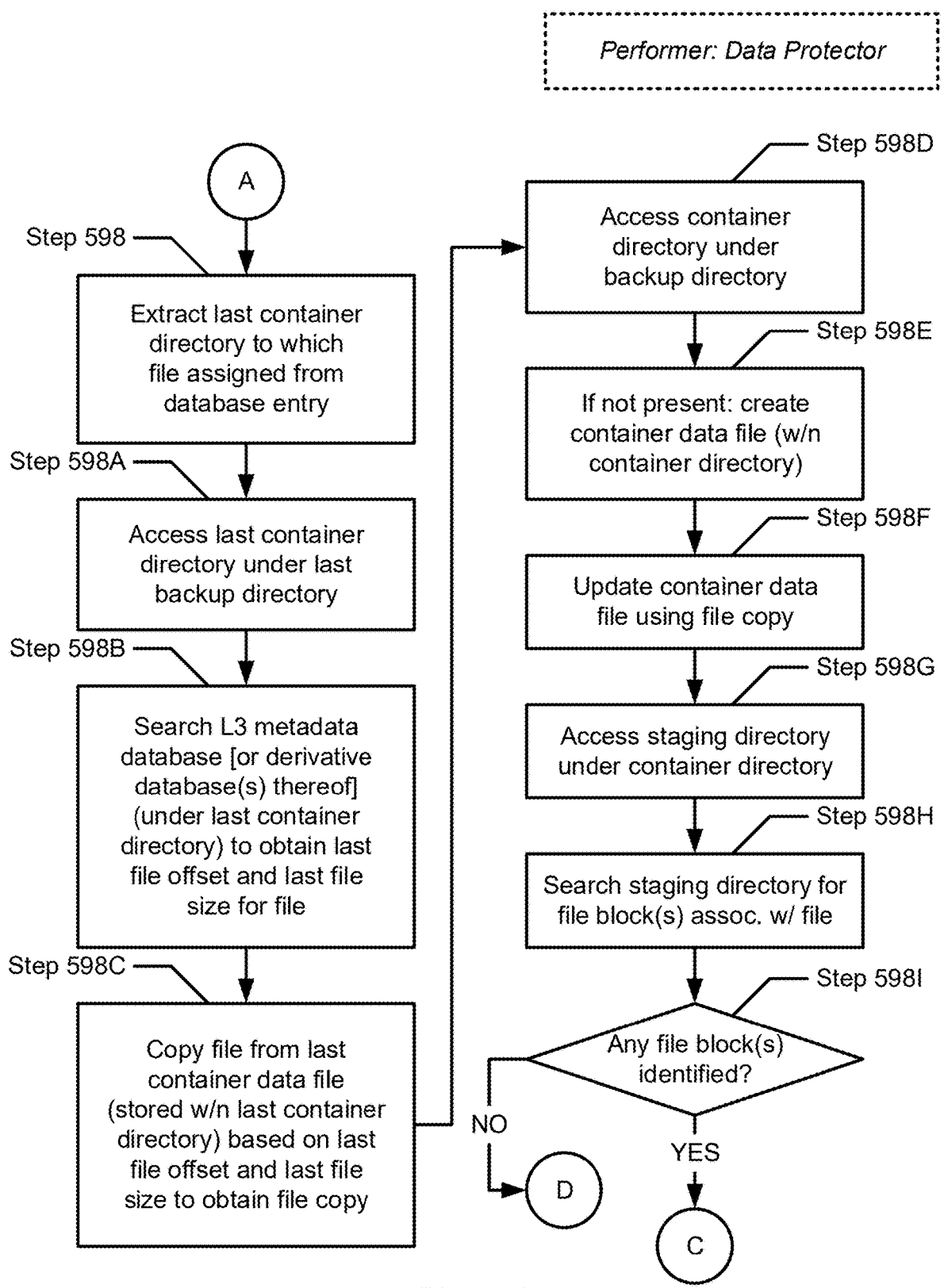

Turning to FIG. 5G, in Step 598, following the determination (made in Step 594) that a database entry has been identified based on the search (performed in Step 592), a last container directory path, for a last container directory, is extracted from the database entry. In one or many embodiment(s) described herein, the last container directory may refer to a container directory, residing under the last backup directory (accessed in Step 590), to which the file had been assigned during the last backup operation.

In Step 598A, using the last container directory path (extracted in Step 598), the last container directory is accessed.

In Step 598B, the L3 database [or any derivative database(s) thereof—i.e., the backup index database and the backup attributes database (see e.g., FIG. 2D)], residing under the last container directory (accessed in Step 598A), is/are searched. In one or many embodiment(s) described herein, the search may be directed to obtaining a last file offset and a last file size for the file.

In Step 598C, the file, within a last container data file, residing under the last container directory (accessed in Step 598A), is copied to obtain a file copy. The file may be located, within the last container data file, using the last file offset and the last file size (obtained in Step 598B).

In Step 598D, the container directory, residing under the backup directory (accessed in Step 584), is accessed.

In Step 598E, if not present, a container data file is created under the container directory. In one or many embodiment(s) described herein, any recently created container data file may refer to an initially empty flat file.

In Step 598F, the container data file is updated using the file copy (obtained in Step 598C). In one or many embodiment(s) described herein, said update may entail appending the data of the file copy to any existing data stored in/by the container data file. Further, in appending the file copy data to the container data file, a file offset specifying a starting byte or location (within the container data file) for the file copy data may be obtained.

In Step 598G, a staging directory, residing under the container directory (accessed in Step 598D), is accessed. In one or many embodiment(s) described herein, the staging directory may (at least temporarily) store one or more file blocks, reflecting change(s) since the last backup operation, for any number of files assigned to the container directory.

In Step 598H, the staging directory (accessed in Step 598G), is searched. In one or many embodiment(s) described herein, the search may be directed to attempting to identify any file block(s), reflecting change(s) since the last backup operation, associated with the file.

In Step S98I, a determination is made, based on the search (performed in Step 598H), as to whether any file block(s), reflecting change(s) since the last backup operation, associated with the file has/have been identified. In one or many embodiment(s) described herein, if it is determined that at least one file block has been identified, then the method proceeds to Step 598J (see e.g., FIG. 5H). On the other hand, in one or many other embodiment(s) described herein, if it is alternatively determined that zero file blocks have been identified, then the method alternatively proceeds to Step 598K (see e.g., FIG. 5H).

Figure 5H:
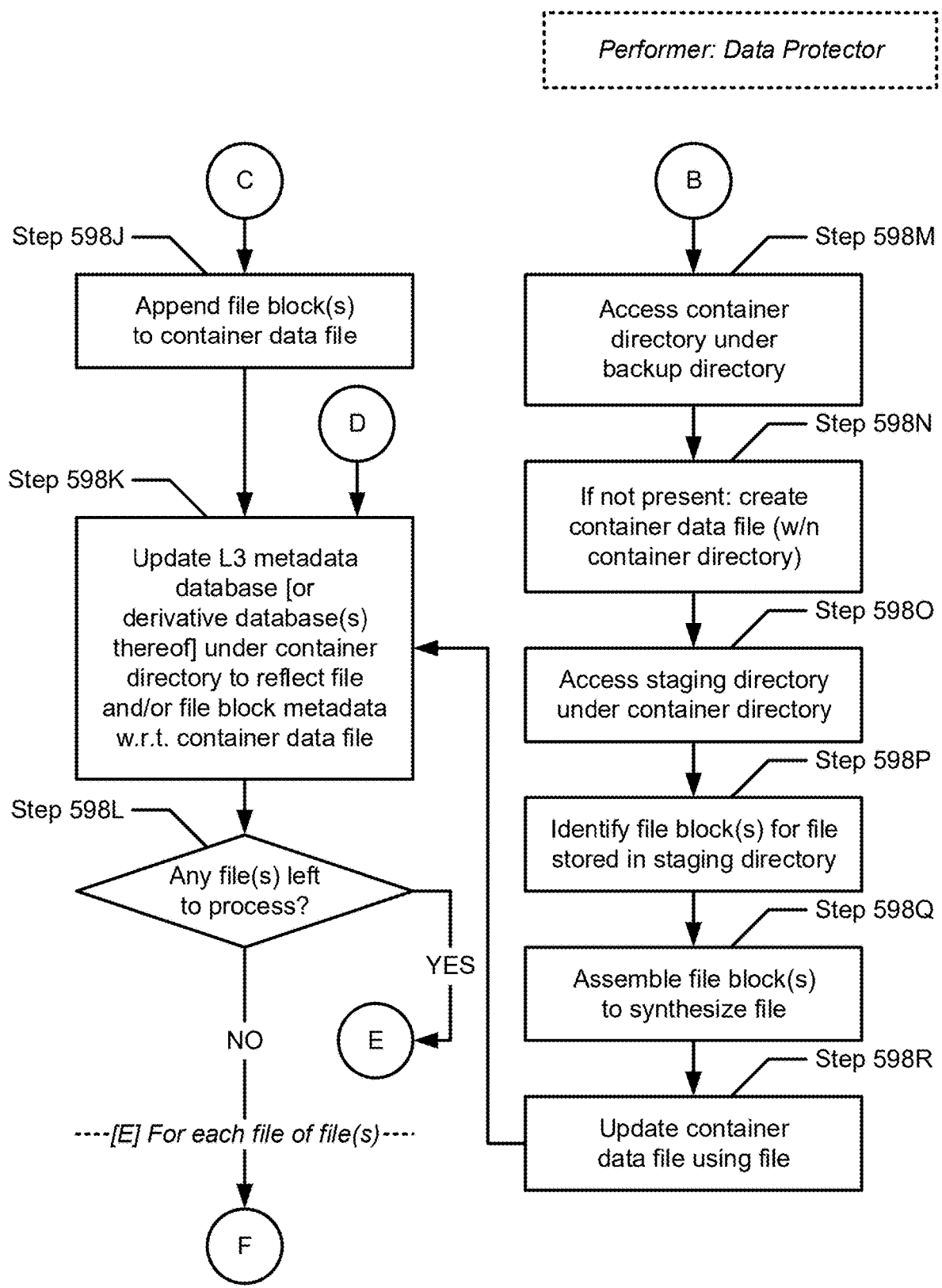

Turning to FIG. 5H, in Step 598J, following the determination (made in Step S98I) that at least one file block, reflecting change(s) since the last backup operation, associated with the file has been identified based on the search (performed in Step 598H), the container data file is updated using the at least one file block. In one or many embodiment(s) described herein, said update may entail appending the data of the at least one file block to any existing data stored in/by the container data file. Further, for each file block data, of the at least one file block, appended to the container data file, a file block offset specifying a starting byte or location (within the container data file) for the file block data may be obtained.

In Step 598K, the L3 database [or any derivative database(s) thereof—i.e., the backup index database and the backup attributes database (see e.g., FIG. 2D)], residing under the container directory (accessed in Step 598D), is updated. In one or many embodiment(s) described herein, said update may reflect any file offset (and/or file block offset) and file size (and/or file block size) associated with the file(s) (and/or file block(s)) (appended in Step(s) 598F, 598J, and/or 598R).

In Step 598L, a determination is made as to whether any file(s) remain to be processed. In one or many embodiment(s) described herein, if it is determined that at least one file remains to be processed, then the method proceeds to Step 590 (see e.g., FIG. 5F). On the other hand, in one or many other embodiment(s) described herein, if it is alternatively determined that zero files remain to be processed, then the method alternatively proceeds to Step 598S (see e.g., FIG. 5I).

In Step 598M, following the alternative determination (made in Step 594) that no database entry has been identified based on the search (performed in Step 592), the container directory, residing under the backup directory (accessed in Step 584), is accessed.

In Step 598N, if not present, a container data file is created under the container directory. In one or many embodiment(s) described herein, any recently created container data file may refer to an initially empty flat file.

In Step S980, the staging directory, residing under the container directory (accessed in Step 598M), is accessed. In one or many embodiment(s) described herein, the staging directory may (at least temporarily) store one or more file blocks for any number of files assigned to the container directory.

In Step 598P, any file block(s), stored in the staging directory (accessed in Step S980) and pertaining to the file, is/are identified.

In Step 598Q, the file block(s) (identified in Step 598P) is/are assembled to form/synthesize the file.

In Step 598R, the container data file, residing under the container directory (accessed in Step 598M), is updated using the file (formed/synthesized in Step 598Q). In one or many embodiment(s) described herein, said update may entail appending the data of the file to any existing data stored in/by the container data file. Further, in appending the file data to the container data file, a file offset specifying a starting byte or location (within the container data file) for the file data may be obtained.

Hereinafter, the method proceeds to Step 598K (described above).

Figure 5I:
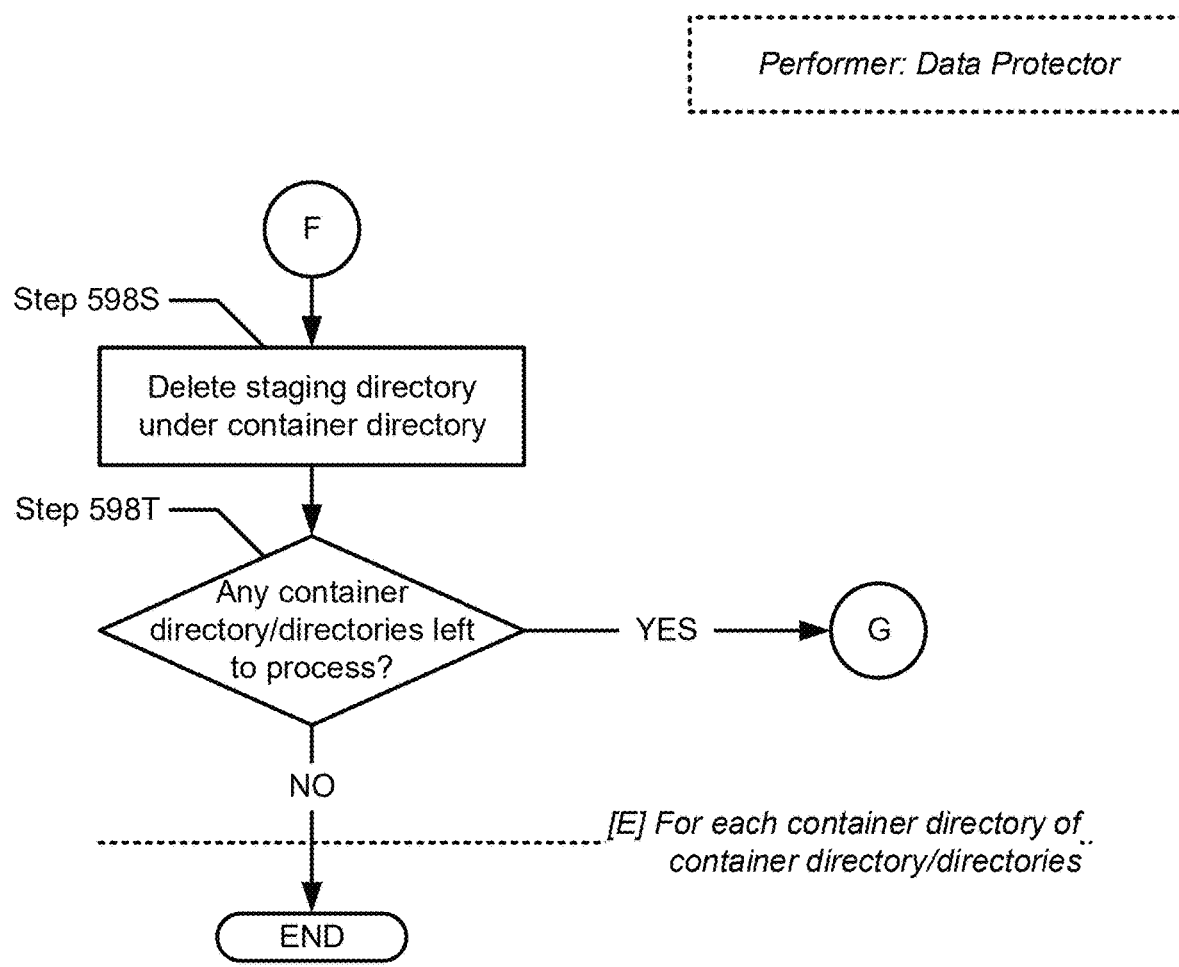

Turning to FIG. 5I, in Step 598S, following the alternative determination (made in Step 598L) that zero files remain to be processed, the staging directory (accessed in Step S980) is deleted.

In Step 598T, a determination is made as to whether any container directory/directories remain to be processed. In one or many embodiment(s) described herein, if it is determined that at least one container directory remains to be processed, then the method proceeds to Step 588 (see e.g., FIG. 5F). On the other hand, if it is alternatively determined that zero container directories remain to be processed, then the method alternatively ends.

Figure 6A:
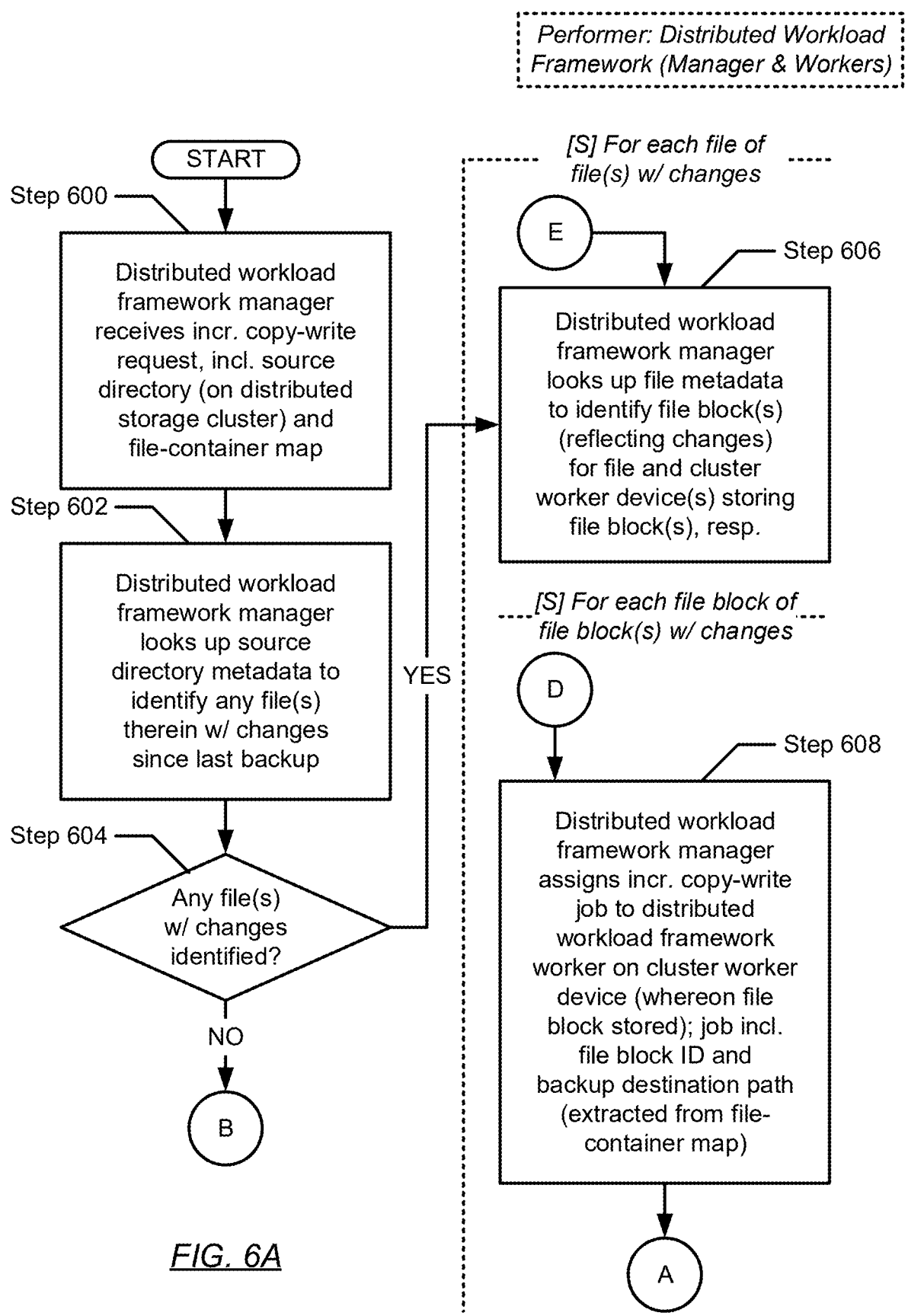
FIGS. 6A-6C shows a flowchart outlining a method for processing an incremental copy-write request in accordance with one or more embodiments described herein.
Figure 6B:
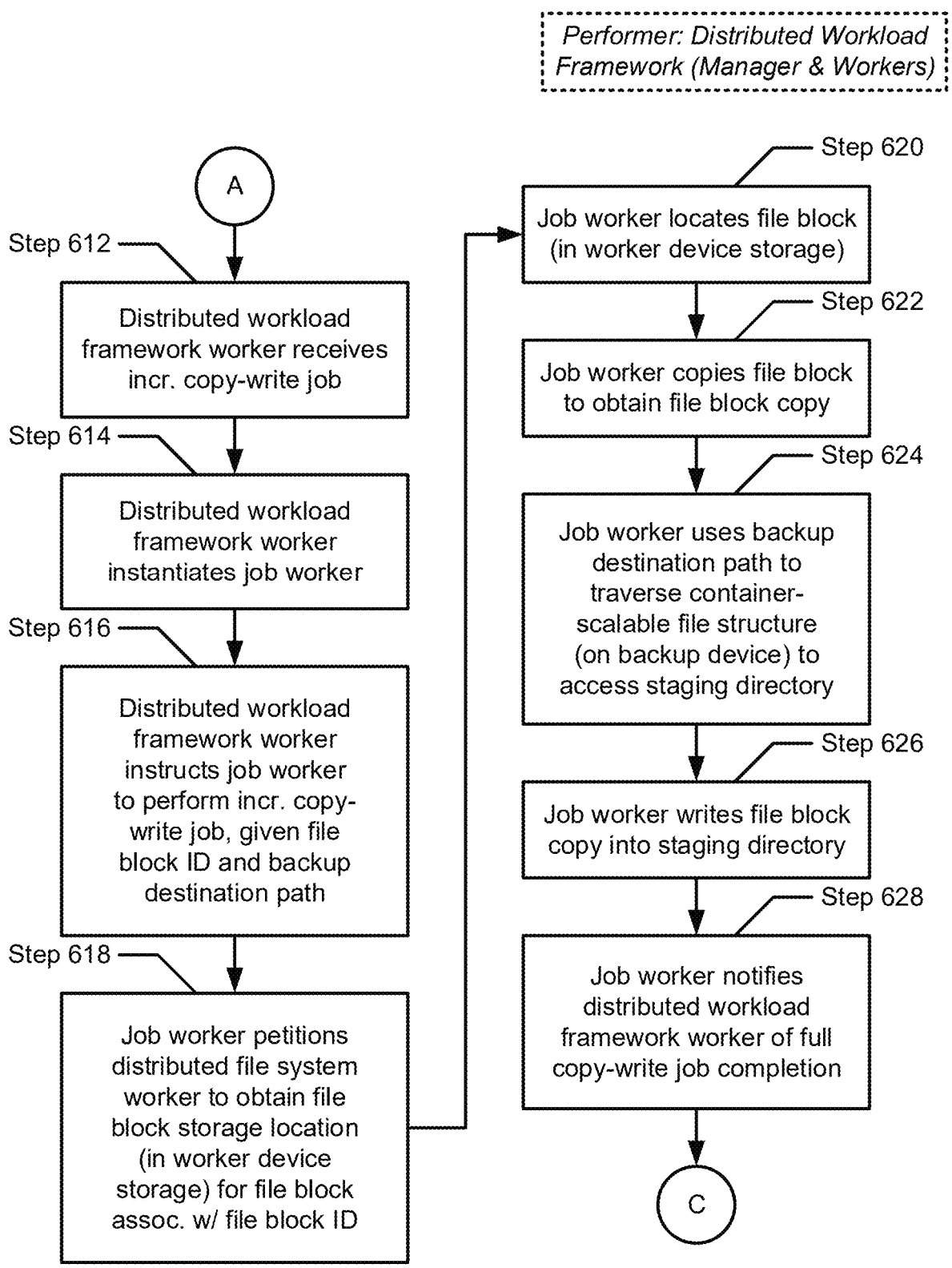
Figure 6C:
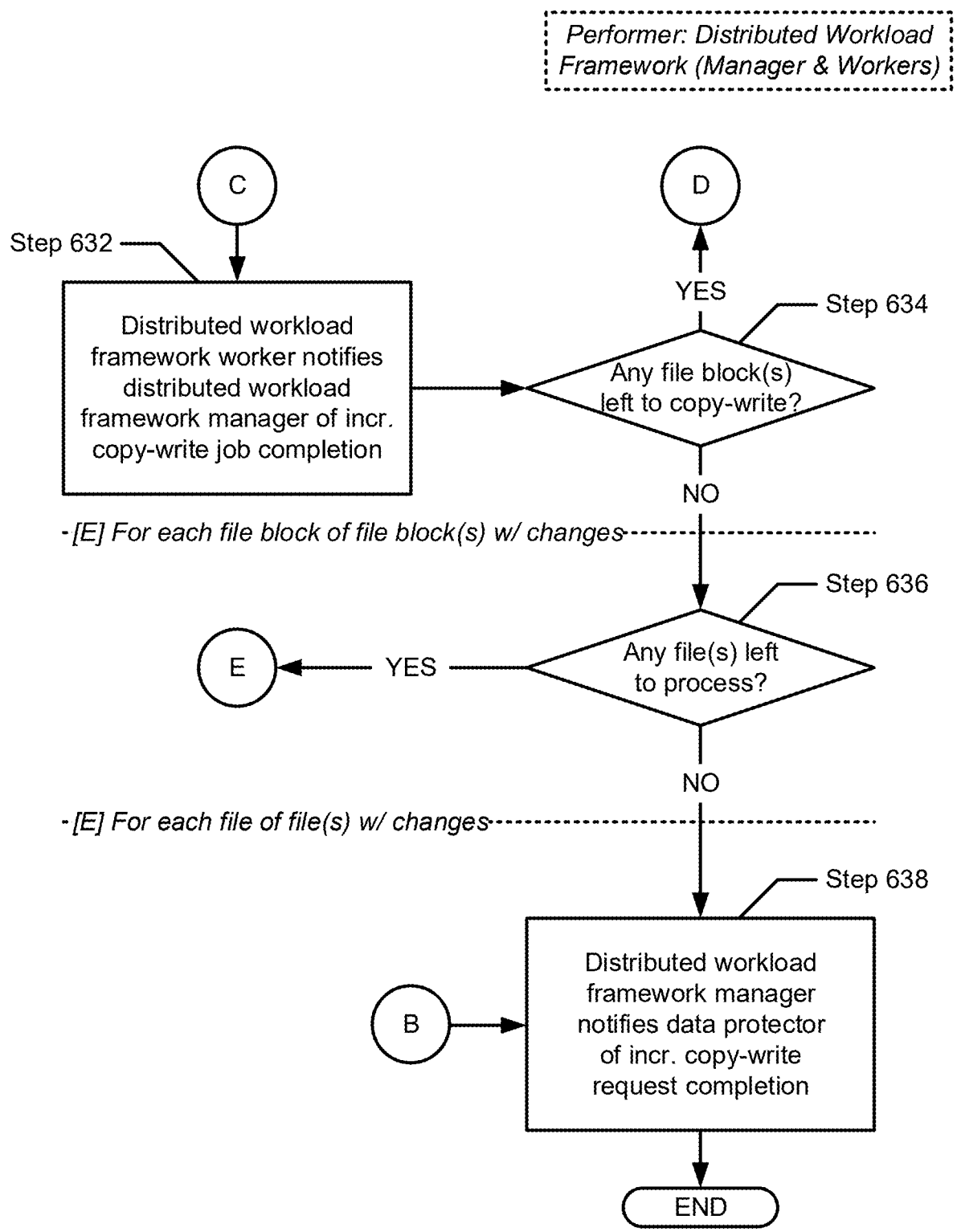

FIGS. 6A-6C shows a flowchart outlining a method for processing an incremental copy-write request in accordance with one or more embodiments described herein. The various steps outlined below may be performed by a combination of the distributed workload framework manager and one or more distributed workload framework workers (see e.g., FIGS. 1B and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 6A, in Step 600, the distributed workload framework manager receives an incremental copy-write request. In one or many embodiment(s) described herein, the incremental copy-write request includes a source directory (residing on the distributed storage cluster) and a file-container map.

In Step 602, the distributed workload framework manager searches any source directory metadata, pertaining to the source directory, to identify one or more files stored therein reflecting any change(s) since performance of the last backup operation.

In Step 604, a determination is made, based on the search (performed in Step 602), as to whether any file(s), reflecting change(s), has/have been identified. In one or many embodiment(s) described herein, if it is determined that at least one file, reflecting change(s), has been identified, then the method proceeds to Step 606. On the other hand, in one or many other embodiment(s) described herein, if it is alternatively determined that zero files reflecting change(s) have been identified, then the method alternatively proceeds to Step 638 (see e.g., FIG. 6C).

Hereinafter, a subset of the remaining steps (i.e., Steps 606, 608, 612, 614, 616, 618, 620, 622, 624, 626, 628, 632, 634, and 636) may be performed, iteratively as a whole, for each file reflecting change(s) (determined to have been identified in Step 604). For example, a first iteration of the indicated remaining steps subset may be performed with respect to a first file reflecting change(s); thereafter, a second iteration of the indicated remaining steps subset may be performed with respect to a second file reflecting change(s); and so forth, including a last iteration of the indicated remaining steps subset that may be performed with respect to a last file reflecting change(s).

In Step 606, the distributed workload framework manager looks up file metadata, pertaining to the file, to identify one or more file blocks of the file, as well as one or more cluster worker devices storing the file block(s), respectively. The file block(s) may include or reflect any subset of the change(s) made to the file.

Hereinafter, a subset of the remaining steps (i.e., Steps 608, 612, 614, 616, 618, 620, 622, 624, 626, 628, 632, and 634) may be performed, iteratively as a whole, for each file block (identified in Step 606) reflecting any subset of the change(s) made to the file. For example, a first iteration of the indicated remaining steps subset may be performed with respect to a first file block reflecting any subset of the change(s) made to the file; thereafter, a second iteration of the indicated remaining steps subset may be performed with respect to a second file block reflecting any subset of the change(s) made to the file; and so forth, including a last iteration of the indicated remaining steps subset that may be performed with respect to a last file block reflecting any subset of the change(s) made to the file.

In Step 608, the distributed workload framework manager assigns an incremental copy-write job to a distributed workload framework worker (see e.g., FIG. 1C) on a cluster worker device (identified in Step 606). The incremental copy-write job includes a file block ID for a file block (identified in Step 606) and a backup destination path extracted from the file-container map.

Hereinafter, the method proceeds to Step 612 (see e.g., FIG. 6B).

Turning to FIG. 6B, in Step 612, the distributed workload framework worker receives the incremental copy-write job (assigned thereto in Step 608).

In Step 614, the distributed workload framework worker instantiates a job worker. The job worker (e.g., a computing container) may refer to a standalone, lightweight virtualization environment within which a software application and its dependencies (e.g., libraries, binaries, tools, configuration files/settings, etc.) execute.

In Step 616, the distributed workload framework worker instructs the job worker (instantiated in Step 614) to perform the incremental copy-write job (received in Step 612). To fulfill the incremental copy-write job, said instructions include the file block ID for the file block and the backup destination path.

In Step 618, the job worker petitions the distributed file system worker (see e.g., FIG. 1C) in order to obtain a file block storage location for the file block. The file block storage location may reference a location in the worker device storage of the cluster worker device whereat the file block is stored.

In Step 620, the job worker locates the file block, in the worker device storage, using the file block storage location (petitioned for in Step 618).

In Step 622, the job worker copies the file block (located in Step 620) to obtain a file block copy.

In Step 624, the job worker traverses the container-scalable file structure (see e.g., FIG. 2A) using the backup destination path to arrive at (and access) the staging directory.

In Step 626, the job worker writes the file block copy (obtained in Step 622) into the staging directory (accessed in Step 624).

In Step 628, the job worker notifies the distributed workload framework worker concerning the completion of the incremental copy-write job.

Hereinafter, the method proceeds to Step 632 (see e.g., FIG. 6C).

Turning to FIG. 6C, in Step 632, the distributed workload framework worker notifies the distributed workload framework manager concerning the completion of the incremental copy-write job (assigned thereto in Step 608).

In Step 634, a determination is made as to whether any file block(s) remain to be copy-written. In one or many embodiment(s) described herein, if it is determined that zero file blocks remain to be copy-written, then the method proceeds to Step 636. On the other hand, in one or many other embodiment(s) described herein, if it is alternatively determined that at least one file block remains to be copy-written, then the method alternatively proceeds to Step 608 (see e.g., FIG. 6A).

In Step 636, a determination is made as to whether any file(s) remain to be processed. In one or many embodiment(s) described herein, if it is determined that zero files remain to be processed, then the method proceeds to Step 638. On the other hand, in one or many other embodiment(s) described herein, if it is alternatively determined that at least one file remains to be processed, then the method alternatively proceeds to Step 606 (see e.g., FIG. 6A).

In Step 638, the distributed workload framework manager notifies the data protector concerning completion of the incremental copy-write request (received in Step 600).

Figure 7A:
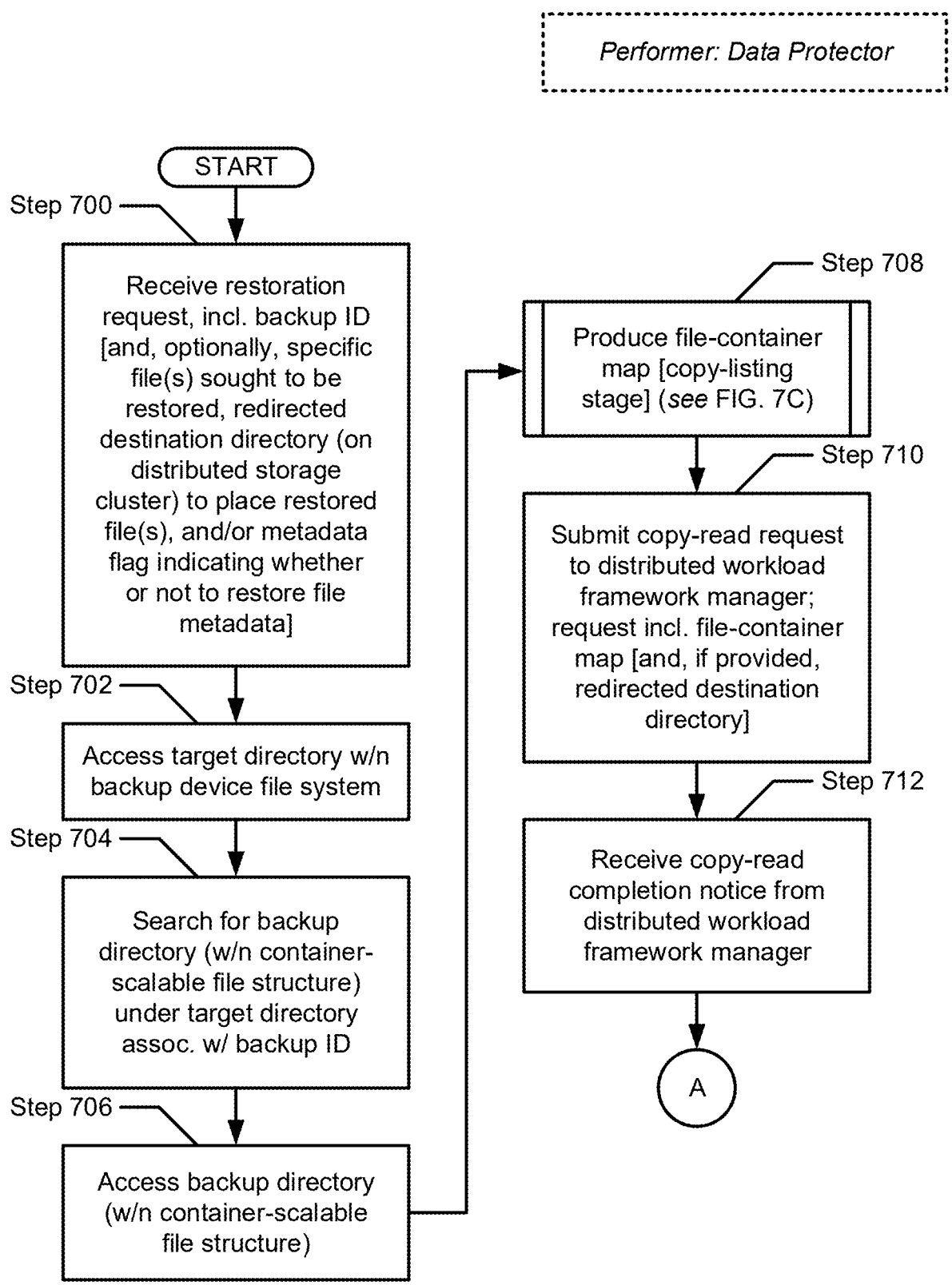
FIGS. 7A and 7B show a flowchart outlining a method for processing a restoration request in accordance with one or more embodiments described herein.
Figure 7B:
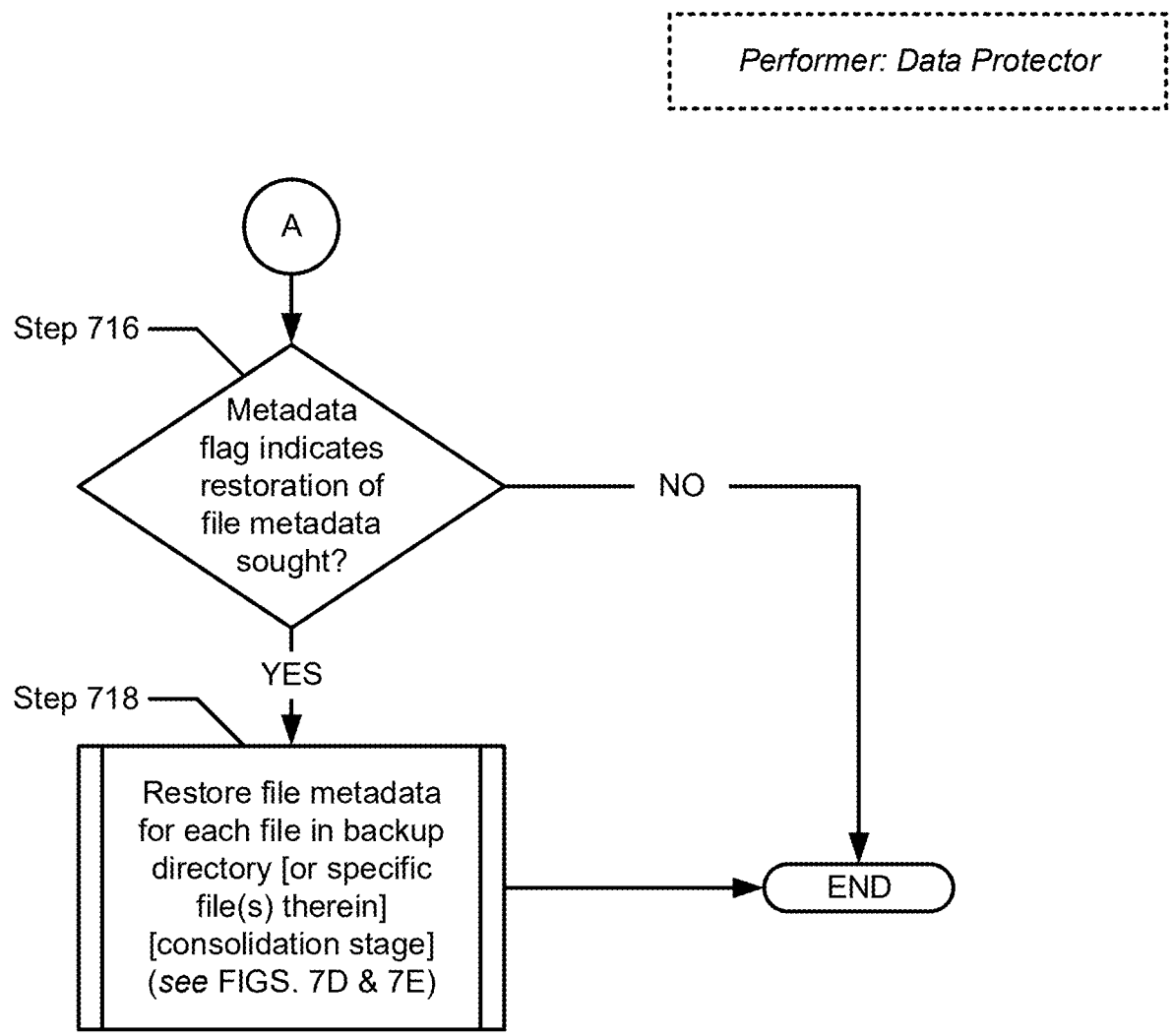

FIGS. 7A and 7B show a flowchart outlining a method for processing a restoration request in accordance with one or more embodiments described herein. The various steps outlined below may be performed by the data protector (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 7A, in Step 700, a restoration request is received. In one or many embodiment(s) described herein, the restoration request includes a backup ID associated with a backup operation, and optionally: (a) one or more specific files sought to be restored from a backup directory corresponding to the backup ID; (b) a redirected destination directory on the distributed storage cluster to which any data is to be restored; and/or (c) a metadata flag indicating whether or not to restore any file metadata.

In Step 702, a target directory, within the backup device file system (see e.g., FIG. 1D), is accessed.

In Step 704, the target directory (accessed in Step 702) is searched in order to identify a backup directory therein/there-under associated with the backup ID (received via the restoration request in Step 700).

In Step 706, the backup directory (identified in Step 704) is accessed.

In Step 708, a file-container map is produced. In one or many embodiment(s) described herein, the file-container map may refer to a data structure at least conveying any assignment(s) (of any file(s) protected through the backup operation associated with the backup directory (identified in Step 704)—to one or more container directories within the container-scalable file structure and residing under the backup directory. The file-container map may further convey a backup destination path identifying a location in the container-scalable file structure (see e.g., FIG. 2A) pertaining to a staging directory dedicated to storing backup copies of said any file(s). The file-container map may, moreover, convey a file block ID, a file block offset, and a file block size respective to each file block of any number of file blocks of said any file(s). Production of the file-container map is illustrated and described in further detail below with respect to FIG. 7C.

In Step 710, a copy-read request is submitted to the distributed workload framework manager. The request includes the file-container map (produced in Step 708) and, if provided, the redirected destination directory (received via the restoration request in Step 700).

In Step 712, a copy-read completion notice is received from the distributed workload framework manager. In one or many embodiment(s) described herein, the copy-read completion notice may include one or more statements informing that the copy-read request (submitted in Step 710) has been fulfilled. Fulfillment of the copy-read request is illustrated and described in further detail with respect to FIGS. 8A-8C, below Hereinafter, the method proceeds to Step 716 (see e.g., FIG. 7B).

Turning to FIG. 7B, in Step 716, a determination is made as to whether the metadata flag (optionally received via the restoration request in Step 700) indicates that restoration of any file metadata is sought. In one or many embodiment(s) described herein, if it is determined that said restoration of file metadata is sought, then the method proceeds to Step 718. On the other hand, in one or many other embodiment(s) described herein, if it is alternatively determined that said restoration of file metadata is not sought, then the method alternatively ends.

In Step 718, following the determination (made in Step 716) that the metadata flag (optionally received via the restoration in Step 700) indicates that restoration of any file metadata is sought, said any file metadata, for any file(s) protected through the backup operation associated with the backup directory (identified in Step 704), is restored. In one or many embodiment(s) described herein, said any file(s) may refer to all file(s) maintained in the backup directory. In one or many other embodiment(s) described herein, said any file(s) may alternatively refer to one or more specific files (optionally specified via the restoration request in Step 700). Further, said restoration of any file metadata is illustrated and described in further detail with respect to FIGS. 7D and 7E, below.

Figure 7C:
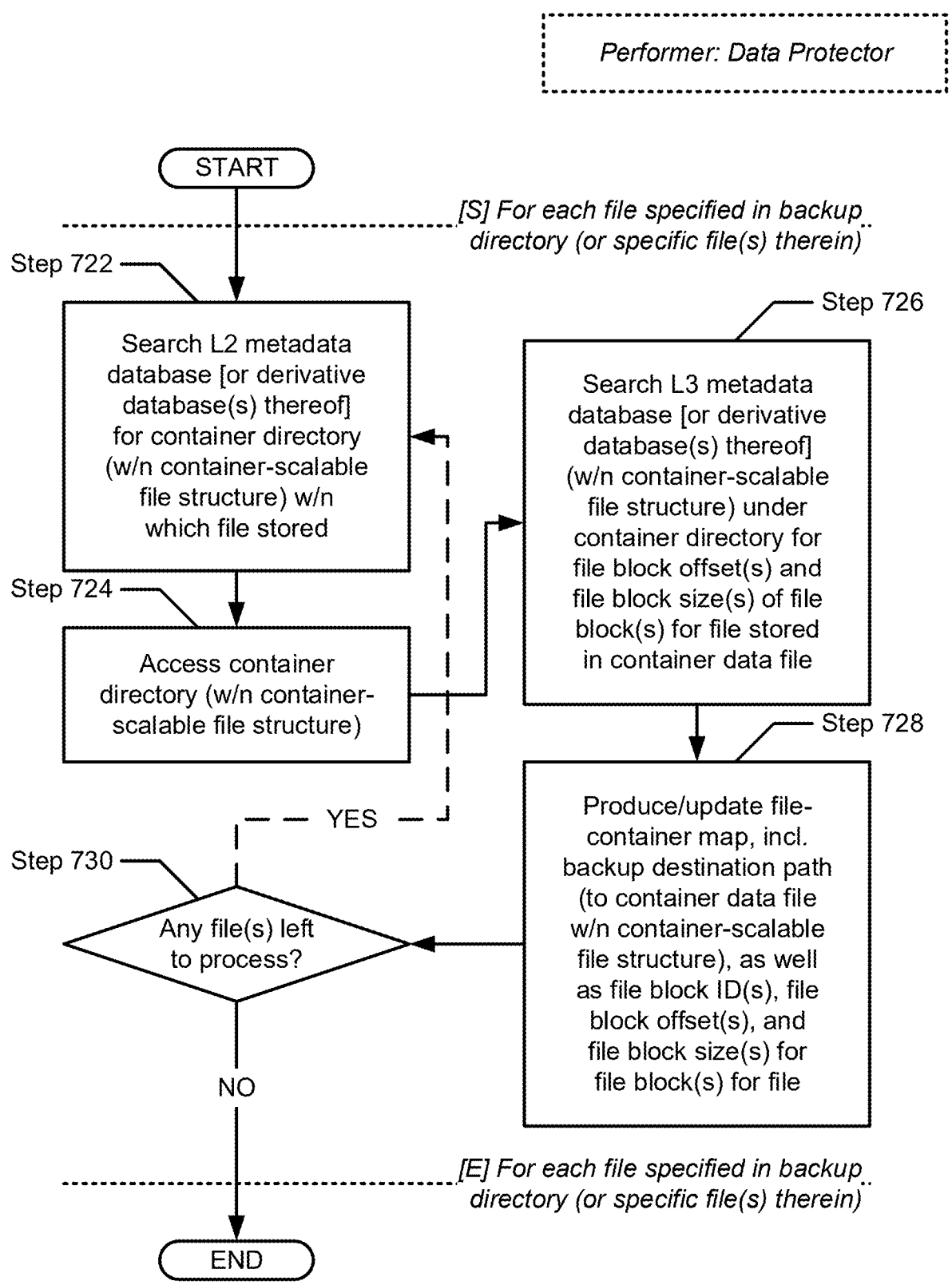
FIG. 7C shows a flowchart outlining a method for producing a file-container map in accordance with one or more embodiments described herein.

FIG. 7C shows a flowchart outlining a method for producing a file-container map in accordance with one or more embodiments described herein. The various steps outlined below may be performed by the data protector (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 7C, all steps hereinafter (i.e., Steps 722, 724, 726, 728, and 730) may be performed, iteratively as a whole, for each file of all file(s) (or of specific file(s) optionally identified via the restoration request received in FIG. 7A, Step 700) maintained in the backup directory (accessed in FIG. 7A, Step 706). For example, a first iteration of the indicated steps may be performed with respect to a first file either of all file(s) or of a specific file(s) subset in the backup directory; thereafter, a second iteration of the indicated steps may be performed with respect to a second file either of all file(s) or of a specific file(s) subset in the backup directory; and so forth, including a last iteration of the indicated steps that may be performed with respect to a last file either of all file(s) or of a specific file(s) subset in the backup directory.

In Step 722, the L2 metadata database [or any derivative database(s) thereof—i.e., the backup permissions database, the backup root database, and/or the single backup metadata database (see e.g., FIG. 2C)], residing under the backup directory (accessed in FIG. 7A, Step 706), is/are searched. In one or many embodiment(s) described herein, the search may be directed to identifying a container directory, residing under the backup directory, within which the file is stored.

In Step 724, the container directory (identified in Step 722) is accessed.

In Step 726, the L3 metadata database [or any derivative database(s) thereof—i.e., the backup index database and the backup attributes database (see e.g., FIG. 2D)], residing under the container directory (accessed in Step 724), is/are searched. In one or many embodiment(s) described herein, the search may be directed to obtaining one or more file block offsets, as well as one or more file block sizes, of one or more file blocks, respectively, for the file, which is maintained in a container data file stored within the container directory.

In Step 728, a file-container map is produced or updated. The file-container map may include an entry for each file stored within the backup directory or, alternatively, for each file of at least a subset of files (e.g., specific file(s)) stored within the backup directory. For a given file, said entry may include: (a) a backup destination path, or a character string uniquely identifying a location in the container-scalable file structure (see e.g., FIG. 2A) whereat the container data file, encompassing the file, is stored; (b) one or more file block IDs corresponding to the file block(s) of the file; and (c) the file block offset(s) and the file block size(s) for the file (obtained in Step 726).

In Step 730, a determination is made as to whether any files remain to be processed. In one or many embodiment(s) described herein, if it is determined that at least one file remains to be processed, then the method proceeds to Step 722. On the other hand, in one or many other embodiment(s) described herein, if it is alternatively determined that zero files remain to be processed, then the method ends.

Figure 7D:
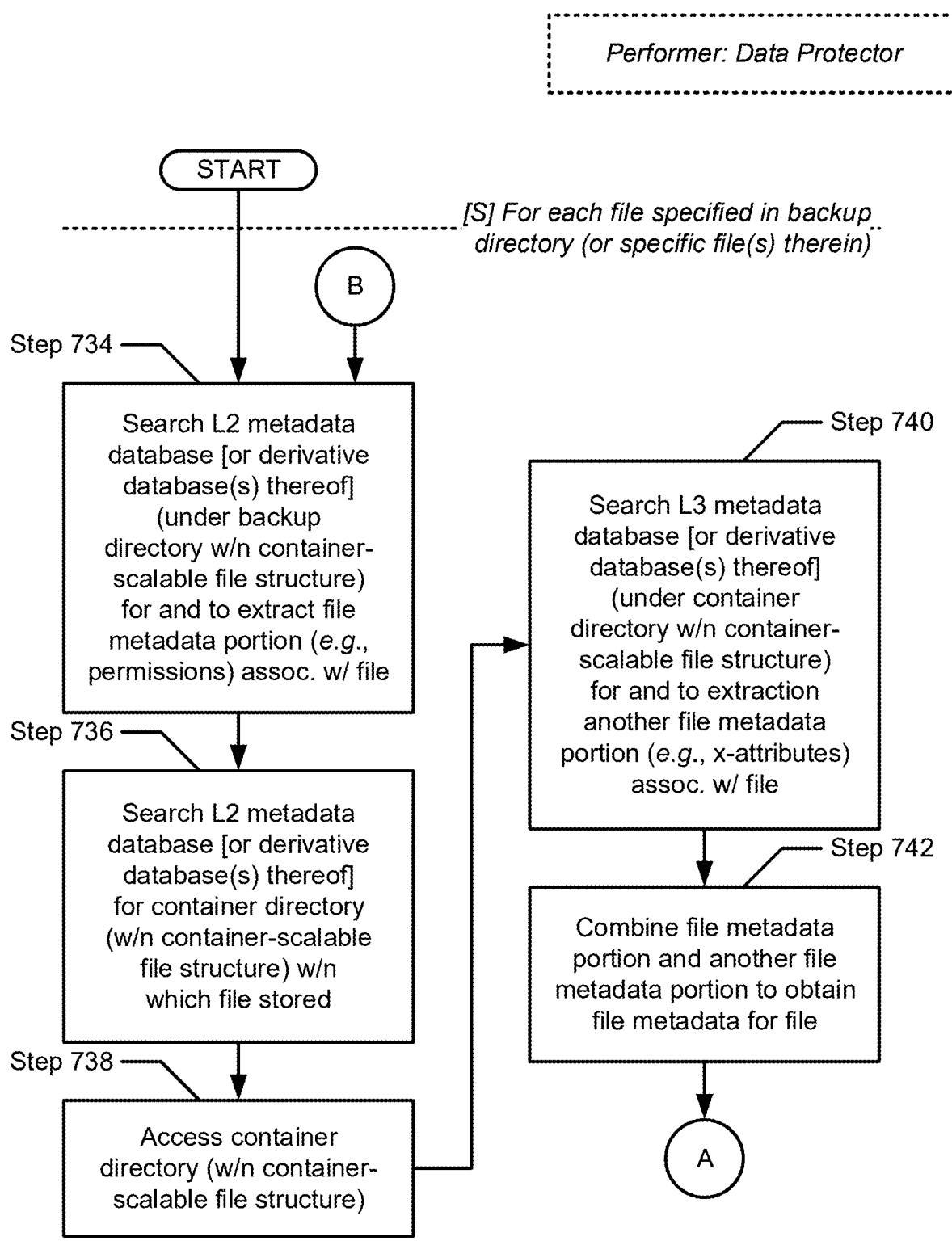
FIGS. 7D and 7E show a flowchart outlining a method for restoring file metadata in accordance with one or more embodiments described herein.
Figure 7E:
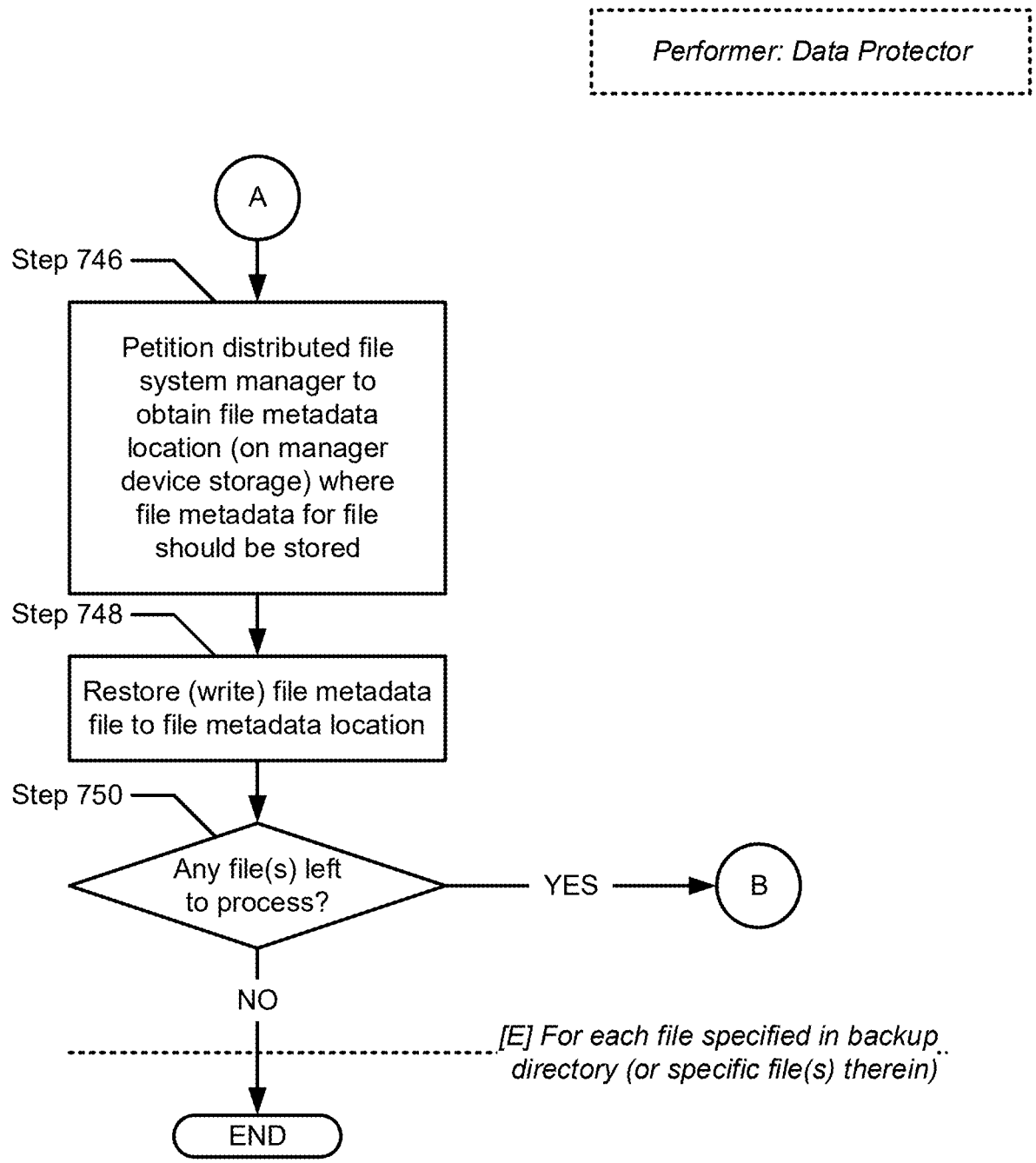

FIGS. 7D and 7E show a flowchart outlining a method for restoring file metadata in accordance with one or more embodiments described herein. The various steps outlined below may be performed by the data protector (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 7D, in Step 734, the L2 metadata database [or any derivative database(s) thereof—i.e., the backup permissions database, the backup root database, and/or the single backup metadata database (see e.g., FIG. 2C)], residing under the backup directory (accessed in FIG. 7A, Step 706), is/are searched. In one or many embodiment(s) described herein, the search may be directed to identifying and extracting a file metadata portion (e.g., access permissions) associated with the file.

In Step 736, the L2 metadata database [or any derivative database(s) thereof—i.e., the backup permissions database, the backup root database, and/or the single backup metadata database (see e.g., FIG. 2C)], residing under the backup directory (accessed in FIG. 7A, Step 706), is/are further searched. In one or many embodiment(s) described herein, the search may be directed to identifying a container directory, residing under the backup directory, within which the file is stored.

In Step 738, the container directory (identified in Step 734) is accessed.

In Step 740, the L3 metadata database [or any derivative database(s) thereof—i.e., the backup index database and the backup attributes database (see e.g., FIG. 2D)], residing under the container directory (accessed in Step 734) is searched. In one or many embodiment(s) described herein, the search may be directed to identifying and extracting another file metadata portion (e.g., extended attributes) associated with the file.

In Step 742, the file metadata portion (extracted in Step 734) and the other file metadata portion (extracted in Step 740) are combined to obtain file metadata for the file.

Hereinafter, the method proceeds to Step 746 (see e.g., FIG. 7E).

Turning to FIG. 7E, in Step 746, the distributed file system manager (see e.g., FIG. 1B) is petitioned in order to obtain a file metadata location, within the manager device storage, where the file metadata is to be restored.

In Step 748, the file metadata (obtained in Step 742) is restored or written to the file metadata location (obtained in Step 746).

In Step 750, a determination is made as to whether any file(s) remain to be processed. In one or many embodiment(s) described herein, if it is determined that at least one file remains to be processed, then the method proceeds to Step 734. On the other hand, in one or many other embodiment(s) described herein, if it is determined that zero files remain to be processed, then the method alternatively ends.

FIGS. 8A-8C show a flowchart outlining a method for processing a copy-read request in accordance with one or more embodiments described herein. The various steps outlined below may be performed by a combination of the distributed workload framework manager and one or more distributed workload framework workers (see e.g., FIGS. 1B and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 8A, in Step 800, the distributed workload framework manager receives a copy-read request. In one or many embodiment(s) described herein, the copy-read request includes a file-container map and, optionally, a redirected destination directory.

Hereinafter, a subset of the remaining steps (i.e., Steps 802, 804, 806, 808, 812, 814, 816, 818, 820, 822, 824, 826, 830, 832, and 834) may be performed, iteratively as a whole, for each file specified in the file-container map (received via the copy-read request in Step 800). For example, a first iteration of the indicated remaining steps subset may be performed with respect to a first file specified in the file-container map; thereafter, a second iteration of the indicated remaining steps subset may be performed with respect to a second file specified in the file-container map; and so forth, including a last iteration of the indicated remaining steps subset that may be performed with respect to a last file specified in the file-container map.

In Step 802, the distributed workload framework manager extracts one or more file block IDs, corresponding respectively to one or more file blocks, of the file from the file-container map.

Hereinafter, a subset of the remaining steps (i.e., Steps 804, 806, 808, 812, 814, 816, 818, 820, 822, 824, 826, 830, and 832) may be performed, iteratively as a whole, for each file block (identified in Step 802) of the file. For example, a first iteration of the indicated remaining steps subset may be performed with respect to a first file block of the file; thereafter, a second iteration of the indicated remaining steps subset may be performed with respect to a second file block of the file; and so forth, including a last iteration of the indicated remaining steps subset that may be performed with respect to a last file block of the file.

In Step 804, the distributed workload framework manager petitions the distributed file system manager (see e.g., FIG. 1B) in order to identify one or more file block hosts (e.g., one or more cluster worker devices) whereon the file block(s) is/are to be restored. The petition includes a file ID for the file and a file block ID for each of the file block(s).

In Step 806, the distributed workload framework manager extracts a backup destination path, as well as file block offset(s) and file block size(s) for the file block(s), from the file-container map. The backup destination path may refer to a character string uniquely identifying a location in the container-scalable file structure (see e.g., FIG. 2A) pertaining to a container data file wherein any number of files is stored.

In Step 808, the distributed workload framework manager assigns a copy-read job to a distributed workload framework worker (see e.g., FIG. 1C) on a cluster worker device (identified in Step 804). The copy-read job includes the backup destination path (extracted in Step 806) as well as the file block offset(s) and file block size(s) (also extracted in Step 806).

Hereinafter, the method proceeds to Step 812 (see e.g., FIG. 8B).

Turning to FIG. 8B, in Step 812, the distributed workload framework worker receives the copy-read job (assigned thereto in Step 808).

In Step 814, the distributed workload framework worker instantiates a job worker. The job worker (e.g., a computing container) may refer to a standalone, lightweight virtualization environment within which a software application and its dependencies (e.g., libraries, binaries, tools, configuration files/settings, etc.) execute.

In Step 816, the distributed workload framework worker instructs the job worker (instantiated in Step 814) to perform the copy-read job (received in Step 812). To fulfill the copy-read job, said instructions include the backup destination path, the file block offset(s), and the file block size(s).

In Step 818, the job worker traverses the container-scalable file structure (see e.g., FIG. 2A) using the backup destination path to arrive at (and access) the container data file.

In Step 820, the job worker reads and copies the file block from the container data file (accessed in Step 818). The reading/copying uses the file block offset and the file block size for the file block.

In Step 822, the job worker writes and restores the file block (copied in Step 820) into worker device storage of the cluster worker device (identified in Step 814) at a worker device storage location.

In Step 824, the job worker notifies the distributed workload framework worker concerning the completion of the copy-read job (received in Step 812).

In Step 826, the distributed workload framework worker provides the worker device storage location (whereto the file block had been restored in Step 822) to the distributed file system worker to be logged thereby.

Hereinafter, the method proceeds to Step 830 (see e.g., FIG. 8C).

Turning to FIG. 8C, in Step 830, the distributed workload framework worker notifies the distributed workload framework manager concerning the completion of the copy-read job (assigned thereto in Step 808).

In Step 832, a determination is made as to whether any file block(s) remain to be copy-read. In one or many embodiment(s) described herein, if it is determined that zero file blocks remain to be copy-read, then the method proceeds to Step 834. On the other hand, in one or many other embodiment(s) described herein, if it is alternatively determined that at least one file block remains to be copy-written, then the method alternatively proceeds to Step 804 (see e.g., FIG. 8A).

In Step 834, a determination is made as to whether any file(s) remain to be processed. In one or many embodiment(s) described herein, if it is determined that zero files remain to be processed, then the method proceeds to Step 836. On the other hand, in one or many other embodiment(s) described herein, if it is alternatively determined that at least one file remains to be processed, then the method alternatively proceeds to Step 802 (see e.g., FIG. 8A).

In Step 836, if the redirected destination directory is specified in the copy-read request (received in Step 800), the distributed workload framework manager petitions the distributed file system manager to logically move the file(s) to the redirected destination directory.

In Step 838, the distributed workload framework manager notifies the data protector concerning completion of the copy-read request (received in Step 800).

Figure 9:
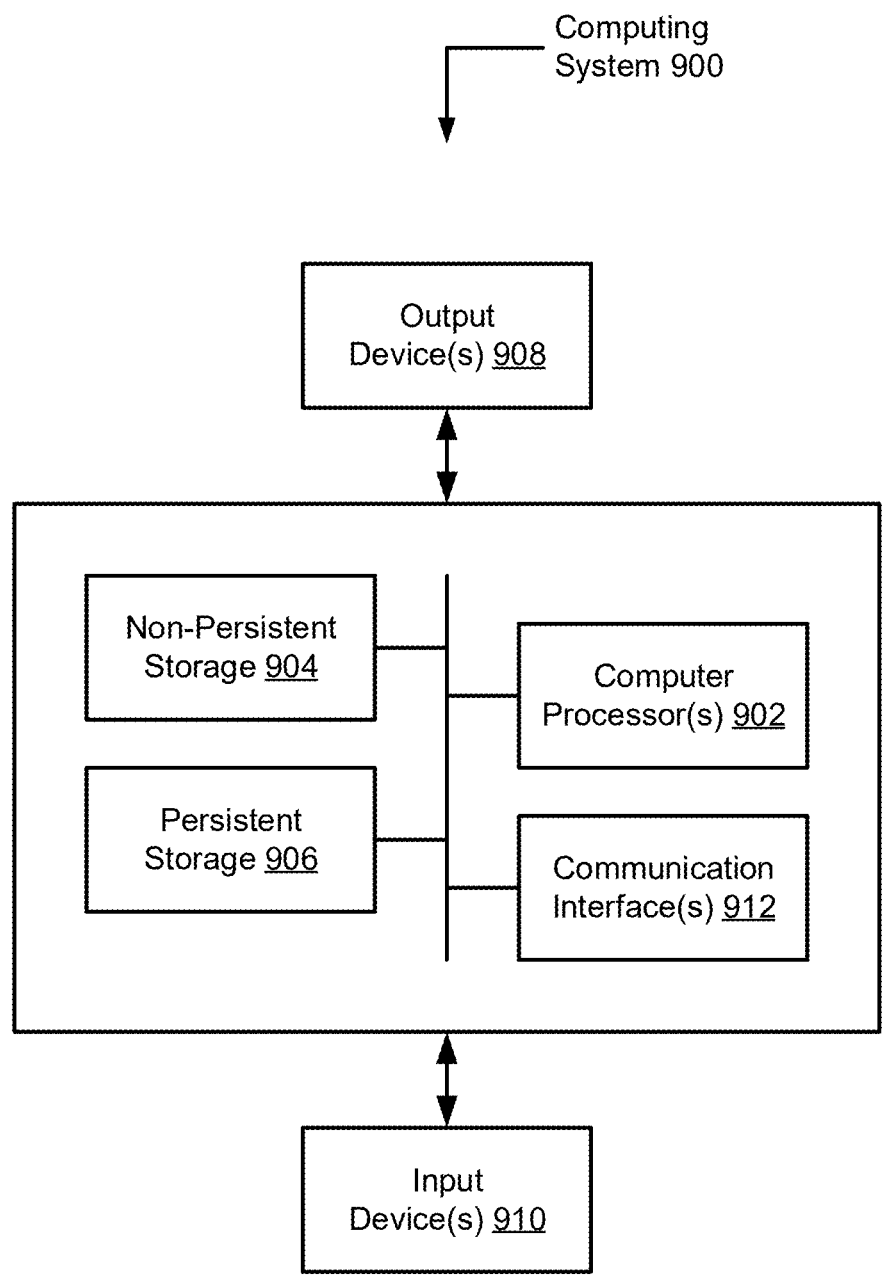
FIG. 9 shows a computing system in accordance with one or more embodiments described herein.

FIG. 9 shows a computing system in accordance with one or more embodiments described herein. The computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one or many embodiment(s) described herein, the computer processor(s) (902) may be an integrated circuit for processing instructions. For example, the computer processor(s) may be one or more cores or micro-cores of a central processing unit (CPU) and/or a graphics processing unit (GPU). The computing system (900) may also include one or more input devices (910), such as a touchscreen, keyboard, mouse, microphone, touchpad, electronic pen, or any other type of input device. Further, the communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

In one or many embodiment(s) described herein, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the embodiments described herein have been disclosed with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A backup device, comprising:
   backup device storage configured to persistently maintain data and metadata related to distributed storage cluster backups according to a container-scalable file structure, the container-scalable file structure comprising:
   a first level (L1) comprising at least one backup directory and a L1 metadata database;
   a second level (L2) branching from each backup directory of the at least one backup directory, and comprising at least one container directory and a L2 metadata database; and
   a third level (L3) branching from each container directory of the at least one container directory, and comprising a staging directory, a L3 metadata database, and a container data file.

2. The backup device of claim 1, wherein each backup directory of the at least one backup directory corresponds to a backup operation entailing files on a distributed storage cluster.

3. The backup device of claim 2, wherein the L1 metadata database comprises a backup metadata database as a derivative database.

4. The backup device of claim 2, wherein each container directory of the at least one container directory, under a backup directory, corresponds to at least one file of the files protected during the backup operation corresponding to the backup directory.

5. The backup device of claim 4, wherein the L2 metadata database, under the backup directory, comprises a backup permissions database, a backup root database, and a backup metadata database as derivative databases.

6. The backup device of claim 5, wherein the backup root directory stores an assignment of each file of the at least one file to a container directory of the at least one container directory.

7. The backup device of claim 4, wherein the staging directory, under a container directory, stores at least one file block of each file of the at least one file corresponding to the container directory.

8. The backup device of claim 7, wherein the L3 metadata database, under the container directory, comprises a backup index database and a backup attributes database as derivative databases.

9. The backup device of claim 8, wherein the backup index database stores a file block offset and a file block size for each file block of the at least one file block of each file of the at least one file, and wherein the file block offset indicates a location of the file block within the container data file.

10. The backup device of claim 7, wherein the container data file, under the container directory, is synthesized from the at least one file block of each file of the at least one file stored in the staging directory, and wherein the container data file is a flat file.

11. A system, comprising:
    a distributed storage cluster; and
    a backup device operatively connected to the distributed storage cluster, and comprising:
    backup device storage configured to persistently maintain data and metadata related to distributed storage cluster backups according to a container-scalable file structure, the container-scalable file structure comprising:
    a first level (L1) comprising at least one backup directory and a L1 metadata database;
    a second level (L2) branching from each backup directory of the at least one backup directory, and comprising at least one container directory and a L2 metadata database; and
    a third level (L3) branching from each container directory of the at least one container directory, and comprising a staging directory, a L3 metadata database, and a container data file.

12. The system of claim 11, wherein each backup directory of the at least one backup directory corresponds to a backup operation entailing files on the distributed storage cluster.

13. The system of claim 12, wherein the L1 metadata database comprises a backup metadata database as a derivative database.

14. The system of claim 12, wherein each container directory of the at least one container directory, under a backup directory, corresponds to at least one file of the files protected during the backup operation corresponding to the backup directory.

15. The system of claim 14, wherein the L2 metadata database, under the backup directory, comprises a backup permissions database, a backup root database, and a backup metadata database as derivative databases.

16. The system of claim 15, wherein the backup root directory stores an assignment of each file of the at least one file to a container directory of the at least one container directory.

17. The system of claim 14, wherein the staging directory, under a container directory, stores at least one file block of each file of the at least one file corresponding to the container directory.

18. The system of claim 17, wherein the L3 metadata database, under the container directory, comprises a backup index database and a backup attributes database as derivative databases.

19. The system of claim 18, wherein the backup index database stores a file block offset and a file block size for each file block of the at least one file block of each file of the at least one file, and wherein the file block offset indicates a location of the file block within the container data file.

20. The system of claim 17, wherein the container data file, under the container directory, is synthesized from the at least one file block of each file of the at least one file stored in the staging directory, and wherein the container data file is a flat file.

\* \* \* \* \*